(12) United States Patent
Lee

(10) Patent No.: US 10,234,624 B2
(45) Date of Patent: Mar. 19, 2019

(54) DISPLAY DEVICE INCLUDING OPTICAL MEMBER WITH FOLDED POSITIONING PORTION AND METHOD OF MANUFACTURING THE SAME

(71) Applicant: Samsung Display Co., Ltd., Yongin-Si, Gyeonggi-Do (KR)

(72) Inventor: Donghyeon Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 143 days.

(21) Appl. No.: 15/341,122

(22) Filed: Nov. 2, 2016

(65) Prior Publication Data

US 2017/0307808 A1    Oct. 26, 2017

(30) Foreign Application Priority Data

Apr. 20, 2016   (KR) .................. 10-2016-0048357

(51) Int. Cl.
    *F21V 8/00*    (2006.01)
(52) U.S. Cl.
    CPC .......... *G02B 6/0088* (2013.01); *G02B 6/005* (2013.01); *G02B 6/0065* (2013.01)
(58) Field of Classification Search
    CPC .... G02B 6/005; G02B 6/0065; G02B 6/0088; G02F 1/133615; G02F 2001/133314; G02F 2001/133322
    See application file for complete search history.

(56) References Cited

U.S. PATENT DOCUMENTS

| 2002/0080298 A1* | 6/2002 | Fukayama | ........ G02F 1/133308 349/58 |
| 2003/0164913 A1* | 9/2003 | Ogawa | ................ G02B 6/0088 349/113 |
| 2011/0261282 A1* | 10/2011 | Jean | .................. G02F 1/133308 349/58 |
| 2014/0170923 A1* | 6/2014 | Sanglier | .................... H01J 9/50 445/2 |
| 2016/0041419 A1* | 2/2016 | Park | .................. G02F 1/133308 349/58 |

FOREIGN PATENT DOCUMENTS

| KR | 1020140115042 A | 9/2014 |
| KR | 1020140115044 A | 9/2014 |
| KR | 1020140115045 A | 9/2014 |
| KR | 1020150038876 A | 4/2015 |

* cited by examiner

*Primary Examiner* — Anh T Mai
*Assistant Examiner* — Steven Y Horikoshi
(74) *Attorney, Agent, or Firm* — Cantor Colburn LLP

(57) ABSTRACT

The display device includes a display panel, an optical member, a light guide plate, and a bottom member. The optical member includes a body contacting a bottom surface of the display panel and a plurality of foldable parts extending from the first body. The light guide plate overlaps the body and is disposed below the optical member. The bottom member is disposed below the light guide plate and has a plurality of slits, which correspond to the plurality of foldable parts. The plurality of first foldable parts are bent from the first body, respectively inserted into the plurality of first slits, and fixed to the bottom member.

33 Claims, 32 Drawing Sheets

DISPLAY DEVICE INCLUDING OPTICAL MEMBER WITH FOLDED POSITIONING PORTION AND METHOD OF MANUFACTURING THE SAME

This application claims priority to Korean Patent Application No. 10-2016-0048357, filed on Apr. 20, 2016, and all the benefits accruing therefrom under 35 U.S.C. § 119, the entire contents of which in its entirety is herein incorporated by reference.

BACKGROUND

1. Field

The present disclosure herein relates to a display device including a display panel, an optical member and a light guide plate, and a method of manufacturing the same.

2. Description of the Related Art

Since a non-light emitting display device such as a liquid crystal display device has a display panel for displaying an image, where the display panel may not self-generate and emit light, a backlight unit for generating and providing light to the display panel is provided in the display device.

The backlight unit may include a light source, a light guide plate guiding light emitted from the light source toward the display panel, and a plurality of optical sheets controlling the light projected from the light guide plate.

SUMMARY

One or more exemplary embodiment provides a display device having a minimized overall thickness and bezel.

One or more exemplary embodiment also provides a method of manufacturing the display device having the minimized overall thickness and bezel.

An embodiment of the inventive concept provides a display device including: a display panel; an optical member including a first body contacting a bottom surface of the display panel and a plurality of first foldable portions extending from the first body; a light guide plate overlapping the first body and disposed below the optical member; and a bottom member disposed below the light guide plate and having a plurality of first slits, which correspond to the plurality of first foldable portions. Here, the plurality of first foldable portions are bent from the first body, respectively inserted into the plurality of first slits, and fixed to the bottom member.

In an embodiment, the optical member may further include a second optical sheet, the second optical sheet may include a second body overlapping a bottom surface of the first body and a plurality of second foldable portions extending from the second body, the bottom member may further include a plurality of second slits, which correspond to the plurality of second foldable portions, and the plurality of second foldable portions may be bent from the second body, respectively inserted into the plurality of second slits, and fixed to the bottom member.

In an exemplary embodiment, the optical member may further include a third optical sheet disposed on a lower portion of the second optical sheet The third optical sheet may include a third body overlapping a bottom surface of the second body and a plurality of third foldable portions extending from the third body. The bottom member may further include a plurality of third slits, which respectively correspond the plurality of third foldable portions. The plurality of third foldable portions may be bent from the third body, respectively inserted into the plurality of third slits, and fixed to the bottom member.

The first optical sheet and the second optical sheet may be selected from a diffuser, a horizontal prism sheet, a vertical prism sheet, or a brightness enhancement film. The diffuser may diffuse light guided by the light guide plate. The horizontal prism sheet may laterally adjust directivity of light incident thereto. The vertical prism sheet may vertically adjust the directivity of light incident thereto. The brightness enhancement film may enhance brightness of light incident thereto.

The first body may define four first edges of the first optical sheet, and the plurality of first foldable portions of the first optical sheet may respectively extend from the four first edges thereof.

In an exemplary embodiment, at least one of the plurality of first foldable portions may overlap at least one of the plurality of second foldable portions. The at least one overlapping first foldable portion may have substantially the same shape as that of the at least one overlapping second foldable portion.

In an exemplary embodiment, the plurality of first foldable portions may not overlap the plurality of second foldable portions. Each of the plurality of first foldable portions may have substantially the same shape as that of each of the plurality of second foldable portions. Each of the first body and the second body may have an area less than that of the display panel.

In an exemplary embodiment, the display device may further include an adhesion member disposed between the light guide plate and the display panel to couple the light guide plate to the display panel. The bottom surface of the display panel may include an area overlapping the first body and the second body and an area that does not overlap the first body and the second body. The top surface of the light guide plate may include an area overlapping the first body and the second body and an area that does not overlap the first body and the second body. The adhesion member may couple the non-overlapping area of the display panel to the non-overlapping area of the light guide plate.

In an exemplary embodiment, the display device may further include a male threaded member provided in plurality, where the plurality of first foldable portions respectively defines a guide opening therein, the bottom member may include: a bottom portion thereof in which the plurality of first slits are defined, and a female threaded member provided in plurality protruding from the bottom portion, the plurality of female threaded members of the bottom member may be respectively inserted into the plurality of guide openings of the plurality of first foldable portions of the first optical sheet, and the plurality of male threaded members may be respectively coupled to the plurality of female threaded members inserted into the plurality of guide openings to fix the plurality of first foldable portions to the bottom member.

In an exemplary embodiment, the display device may further include a protective member provided in plurality each defining a fixing opening therein into which the plurality of female threaded members are respectively inserted, where the plurality of protective members may be respectively disposed on the plurality of first foldable portions into which the plurality of female threaded members of the bottom member are respectively inserted, and the plurality of male threaded members respectively coupled to the plurality of female threaded members of the bottom member may extend through a corresponding fixing opening of the protective members to fix the protective member to the bottom member.

In an exemplary embodiment, the display device may further include a female threaded member provided in plurality, where the plurality of first foldable portions respectively defines a guide opening therein, the bottom member may include: a bottom portion thereof in which the plurality of first slits are defined, and a male threaded member provided in plurality protruding from the bottom portion, the plurality of male threaded member of the bottom member may be respectively inserted into the plurality of guide openings of the plurality of first foldable portions of the first optical sheet, and the plurality of female threaded members may be respectively coupled to the plurality of male threaded members inserted into the plurality of guide openings to fix the plurality of first foldable portions to the bottom member.

In an exemplary embodiment, the display device may further include a protective member provided in plurality each defining a fixing opening therein into which the plurality of male threaded member are respectively inserted, where the plurality of protective members may be respectively disposed on the plurality of first foldable portions into which the plurality of male threaded members of the bottom member are respectively inserted, and the plurality of the female threaded members respectively coupled to the plurality of male threaded members of the bottom member may extend through a corresponding fixing opening of the protective members to fix the protective member to the bottom member.

In an exemplary embodiment, the display device may further include an adhesion member provided in plurality respectively between the plurality of first foldable portions of the first optical sheet and the bottom member to fix the plurality of first foldable portions to the bottom member.

In an embodiment, a plurality of cut-away portions may be defined in the plurality of first foldable parts, respectively. The bottom member may include a bottom part and a plurality of hooks. The plurality of first slits may be defined in the bottom part. The plurality of hooks may protrude from the bottom part and be respectively inserted into the plurality of cut-away portions.

In an exemplary embodiment, the bottom member may include a bottom portion thereof in which the plurality of first slits are defined, and a cut portion of the bottom portion bent away from the display panel to define a support member provided in plurality respectively at one side of each of the plurality of first slits, and the plurality of support members cut from the bottom portion and bent away from the display panel may respectively define dimensions of the plurality of first slits.

In an exemplary embodiment of the invention, a method of assembling a display device including: assembling a display module of the display device which displays an image with light, the display device including: a display panel, an optical member including a first optical sheet and a second optical sheet, a light guide plate, and a bottom member, the assembling the display module including: a display panel assembly process; an optical member assembly process; an adhesive applying process; and a light guide plate assembly process.

In the display panel assembly process, a jig is provided including an accommodation space thereof defined by a first insertion region and a second insertion region which is provided in plurality extending from edges of the first insertion region, and the display panel is disposed in the first insertion region of the jig.

In the optical member assembly process, the optical member is disposed in the accommodation space of the jig to contact the display panel disposed in the first insertion region of the jig, where the optical member disposed in the accommodation space of the jig exposes a portion of the display panel in the jig and includes: the first optical sheet defining a first body thereof disposed in the first insertion region of the jig, and a first foldable portion thereof provided in plurality extending from the first body and respectively disposed in a corresponding second insertion region among the plurality of second insertion regions of the jig, and the second optical sheet defining a second body thereof disposed in the first insertion region of the jig, and a second foldable portion thereof provided in plurality extending from the second body and respectively disposed in the corresponding second insertion region of the plurality of second insertion regions in which the first foldable portion is disposed.

In the adhesive applying process, an adhesive is applied to the exposed portion of the display panel in the jig.

In the light guide assembly process, the light guide plate is disposed in the accommodation space of the jig with the display panel and the optical member disposed therein, and the display panel and the light guide plate are adhered to each other with the optical member therebetween, to assemble the display module in the accommodation space of the jig to include the display panel, the optical member and the light guide plate.

In an exemplary embodiment, the method may further include a jig separation process in which the assembled display module disposed in the accommodation space of the jig is separated from the jig.

In an exemplary embodiment, the method may further include a foldable portion bending process in which the plurality of first foldable portions of the first optical sheet are bent from the first body and toward the bottom member, and the plurality of second foldable portions are bent from the second body and toward the bottom member.

In an exemplary embodiment, the method may further include a bottom member assembly process in which a first slit and a second slit are each defined in plurality in the bottom member, the plurality of bent first foldable portions are respectively inserted into the plurality of first slits, and the plurality of bent second foldable portions are respectively inserted into the plurality of second slits.

In an exemplary embodiment, the method may further include a bottom member fixing process in which the plurality of bent first foldable portions inserted into the plurality of first slits and the plurality of second bent foldable portions inserted into the plurality of second slits are fixed to the bottom member.

In an exemplary embodiment, the bottom member may include: a bottom portion thereof in which the plurality of first slits and the plurality of second slits are defined, and a cut portion of the bottom portion bent away from the display panel to define a support member provided in plurality respectively at one side of each of the plurality of first slits and the plurality of second slits. The plurality of support members cut from the bottom portion and bent away from the display panel may respectively define dimensions of the plurality of first slits and the plurality of second slits of the bottom member.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
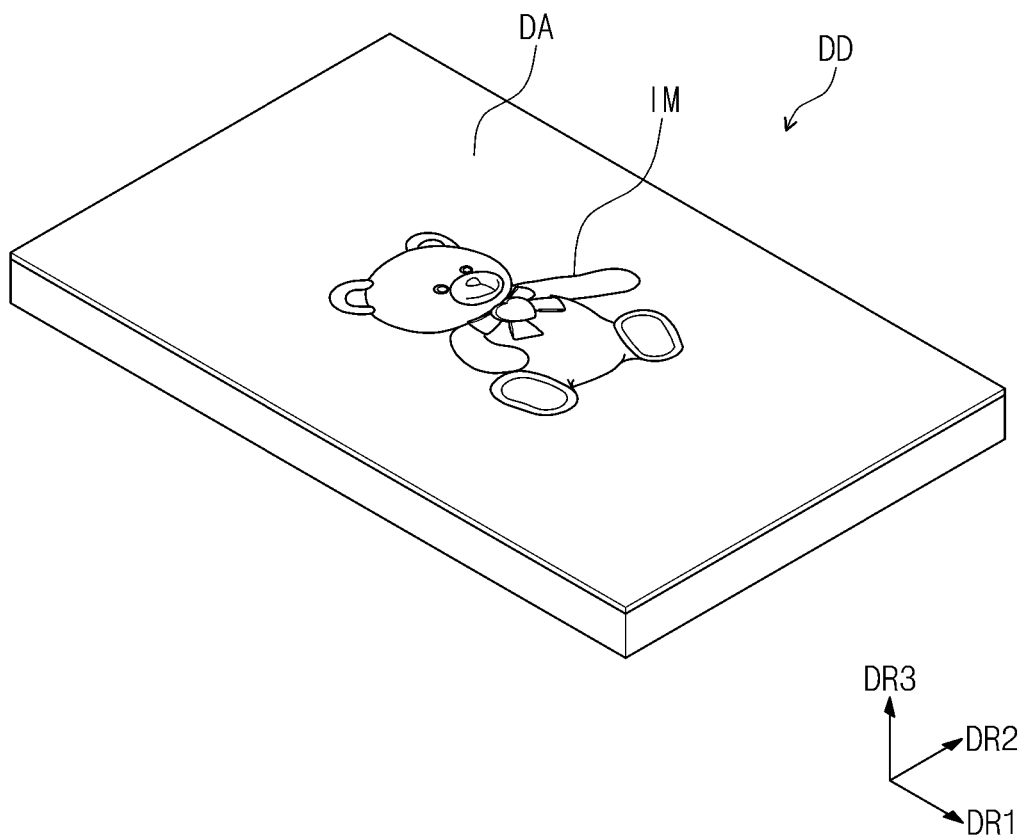
FIG. 1 is a perspective view of an exemplary embodiment of a display device according to the invention.

The objects, other objectives, features, and advantages of the invention will be understood without difficulties through exemplary embodiments below related to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In a display device, a backlight unit may include a light source which generates and emits light, a light guide plate guiding light emitted from the light source and projecting the guided light toward a display panel of the display device, and a plurality of optical sheets controlling the light projected from the light guide plate. In a process of assembling the display device, a separate and individual mold frame is disposed between a top cover of the display panel and a bottom member of the display device. Although the mold frame serves to support the display panel, the optical member, the light guide plate and the like, forming a display device having a relatively small or minimal thickness or a display device having a relatively slim or minimized bezel may be difficult due to the mold frame.

Figure 2A:
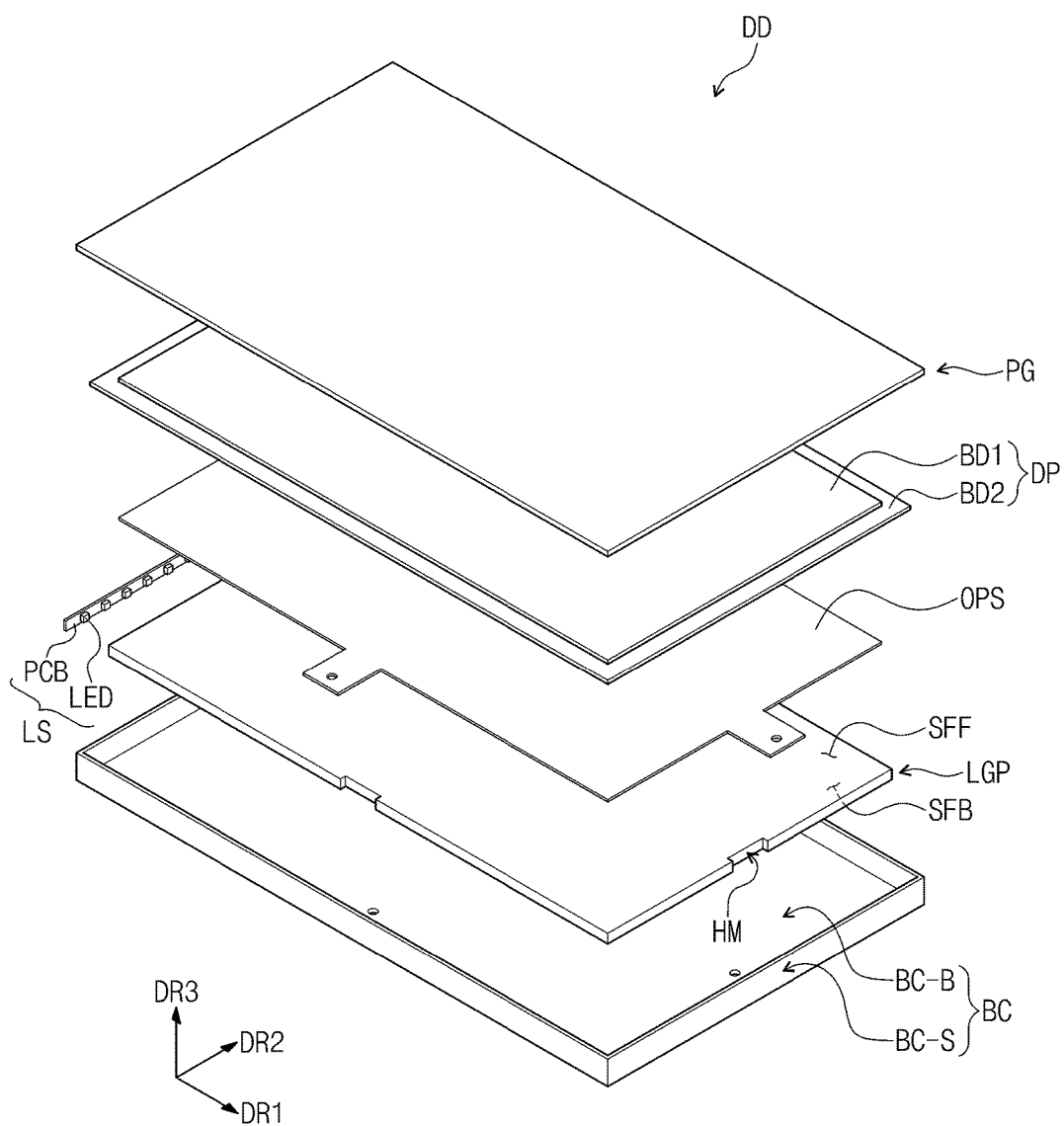
FIG. 2A is an exemplary embodiment of an exploded perspective view illustrating the display device in FIG. 1.
Figure 2B:
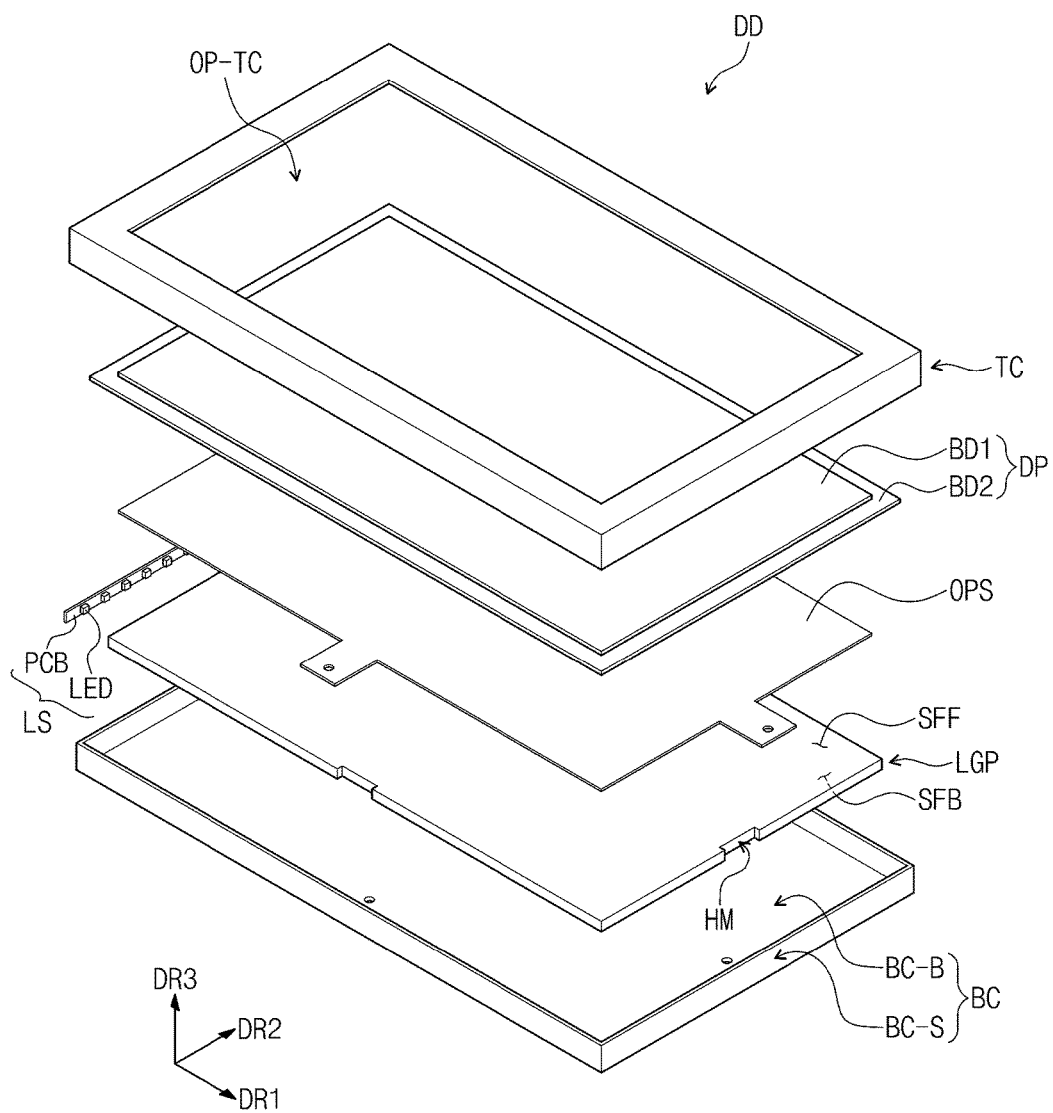
FIG. 2B is another exemplary embodiment of an exploded perspective view illustrating the display device in FIG. 1.

FIG. 1 is a perspective view illustrating an exemplary embodiment of a display device DD according to the invention. FIG. 2A is an exemplary embodiment of an exploded perspective view illustrating the display device DD in FIG. 1. FIG. 2B is another exemplary embodiment of an exploded perspective view illustrating the display device according to the invention.

As illustrated in FIGS. 1 and 2A, the display device DD includes a protective glass PG, a display panel DP, a light guide plate LGP, a light source LS, an optical sheet OPS and a bottom member BC. Although not shown, the display device DD may further include a bottom cover. The bottom cover may be disposed on a lower portion of the bottom cover BC to protect the display device DD from external shock or pollutants.

As illustrated in FIG. 1, the display device DD provides an image IM to a consumer at a display area DA of the display device DD. As an example of the image IM, a teddy bear is illustrated.

The protective glass PG may be disposed on a viewing or display side the display panel DP to protect the display panel DP from external shock or pollutants. The protective glass PG may be coupled to the display panel DP and/or the bottom member BC such as through a resin or the like. However, an embodiment of the invention is not limited to the coupling method. In an exemplary embodiment, for example, the protective glass PG may be disposed on the display panel DP in other methods. Alternatively, the protective glass PG may be omitted.

The display panel DP generates and displays an image. The display panel DP is not especially limited thereto. In an exemplary embodiment, for example, the display panel DP may include a non-light emitting type display panel that uses light generated from a separate light source, e.g., a transflective type display panel or a transmissive type display panel. Hereinafter, the display panel DP will be described as a liquid crystal display panel.

The display panel DP may include a first display substrate BD1, a second display substrate BD2 facing the first display substrate BD1, and a liquid crystal layer (not shown) disposed therebetween. The liquid crystal layer may include a plurality of liquid crystal molecules for which an orientation thereof is changed according to an electric field formed between the first display substrate BD1 and the second display substrate BD2. Although not separately shown, a pair of polarizing plates (not shown) may be disposed on upper and lower portions of the display panel DP. Although the display panel DP is illustrated as display in a flat state in FIG. 1, the invention is not limited thereto. In an exemplary embodiment, for example, the display panel DP may be curved at a predetermined curvature according to the invention.

The light guide plate LGP guides light emitted from the light source LS toward the display panel DP. The light guide plate LGP may include a front surface SFF and a rear surface SFB. Side surfaces of the light guide plate LGP connect the front surface SFF and the rear surface SFB to each other. The front surface SFF is a surface through which light is projected toward the display panel DP. A diffusion pattern which diffuses the light may be provided on at least one of the front surface SFF and the rear surface SFB.

The light source LS may include a first light emitting diode package LED provided in plural and a printed circuit board PCB. The light emitting diode packages LED are mounted on the printed circuit board PCB. Although the light source LS is disposed on a side surface of the light guide plate LGP, the invention is not limited thereto. The light source LS may generate and emit light at a wavelength of about 430 nanometers (nm) to about 780 nm, which is in the visible ray region. The light emitted from the light source LS is incident into the light guide plate LGP. Hereinafter, the light source LS may not be illustrated in the further drawings for convenience of description.

Although not shown, a reflective member may be disposed adjacent to the rear surface SFB of the light guide plate LGP. The reflective member reflects the light output through the rear surface SFB of the light guide plate LGP. The light reflected by the reflective member may be re-incident into the light guide plate LGP.

According to an exemplary embodiment of the invention, the reflective member may have a sheet shape separate from other elements of the display device and having a cross-sectional thickness of several micrometers (μm) to several hundred μm. According to another exemplary embodiment of the invention, instead of being a separate sheet, the reflective member may be applied on a bottom surface of the light guide plate LGP to be integral with the light guide plate LGP and define the rear surface thereof.

A recessed groove HM corresponding to a foldable part OPS-F (refer to FIG. 3) of the optical sheet OPS may be defined in the light guide plate LGP. The groove HM may be recessed from a side surface of the light guide plate LGP. The recessed groove HM may serve to guide the foldable part OPS-F (refer to FIG. 3) in a foldable part bending process in a method of manufacturing a display device. However, the shape of the light guide plate LGP is not limited thereto. In an exemplary embodiment, for example, the recessed groove HM may not be defined in the light guide plate LGP and may be omitted therefrom.

The optical sheet OPS may be one of a diffuser, a horizontal prism sheet, a vertical prism sheet or a brightness enhancement film. However, the kind of the optical sheet OPS is not limited thereto. In an exemplary embodiment, for example, the optical sheet OPS may include a different kind of sheet than those listed above, for varying or enhancing a characteristic of incident light.

The diffuser diffuses the light guided by the light guide plate LGP. The diffuser may include transparent binders and globular shaped beads. The binders may include or be made of one of polyurethane, polyester, fluorine-based resin, silicon-based resin, polyamide, or epoxy resin. The beads may include or be made of at least one of acrylic resin, polyurethane, polyvinyl chloride, polystyrene, polyacrylonitrile and polyamide.

Since light is transmitted through the binders and the beads, the binders and the beads may be colorless and transparent. In an exemplary embodiment, an average particle diameter of the beads may be equal to or greater than about 1 μm and equal to or less than about 50 μm. When the average particle diameter is less than the above-described range, a satisfactory light diffusion function may not be performed, and when the average particle diameter is greater than the above-described range, a resin composition constituting the diffuser may be difficult to be applied.

The horizontal prism sheet and the vertical prism sheet collect the light diffused by the diffuser toward the display panel DP.

The vertical prism sheet vertically adjusts directivity of the incident light. The horizontal prism sheet laterally adjusts the directivity of the incident light.

According to an exemplary embodiment of the invention, each of the horizontal prism sheet and the vertical prism sheet may include a base film (not shown) and a plurality of prisms (not shown). The base film reduces or effectively prevents the prisms from directly contacting the light guide plate LGP. Accordingly, damage to the light guide plate LGP by the prisms is reduced or effectively prevented. The base film may include polyethylene phthalate. The prisms are disposed on or defined by the base film. The prisms may include a synthetic resin.

The brightness enhancement film enhances brightness of the light incident thereto. According to an exemplary embodiment of the invention, the brightness enhancement film may be a dual brightness enhancement film ("DBEF").

The brightness enhancement film serves to selectively transmit light in one polarization state of the incident light and return light in a different polarization state to the light guide plate LGP.

Light that does not pass through and is reflected by the brightness enhancement film is re-reflected through the light guide plate LGP toward the display panel DP. The brightness enhancement film continuously and repeatedly transmits only the light in a specific polarization state and then reflects a remainder of the light.

Since only light in a desired polarization state is emitted toward the display panel DP through repeating the above-described process, loss of the emitted light is reduced to increase the brightness of the display device DD.

The bottom member BC is disposed on a lower portion of the light guide plate LGP. The bottom member BC includes a bottom part or portion BC-B and a sidewall BC-S which is disposed along edges of the bottom part BC-B. One among the bottom part BC-B and the sidewall BC-S may extend to define the other one of the bottom part BC-B and the sidewall BC-S.

Referring to FIG. 2B, another exemplary embodiment of the display device DD according to the invention may further include a top cover TC. The top cover TC may protect the display panel DP, the light guide plate LGP, the light source LS and the optical sheet OPS, which are described above. An opening part or portion OP-TC of the top cover TC may expose a front surface of the display panel DP to define the display area DA of the display device.

Figure 3:
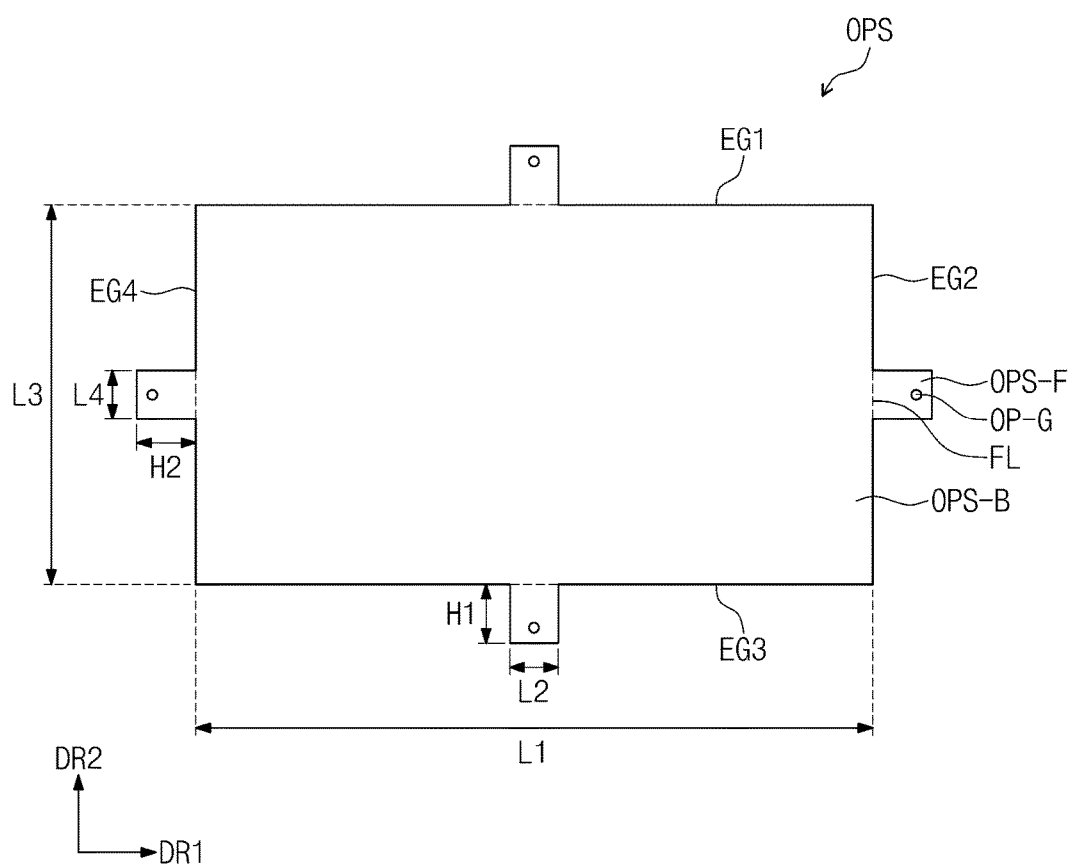
FIG. 3 is a top plan view illustrating an exemplary embodiment of an optical sheet of the display device in FIG. 1.

FIG. 3 is a top plan view illustrating an exemplary embodiment of the optical sheet OPS of the display device DD illustrated in FIG. 1. The optical sheet OPS includes a body OPS-B and a foldable part or portion OPS-F provided in plural extended from an outer edge of the body OPS-B. One of the body OPS-B and the foldable part OPS-F may extend to define the other one of the body OPS-B and the foldable part OPS-F. According to an exemplary embodiment illustrated in FIG. 3, the optical sheet OPS includes four foldable parts OPS-F. However, the number of the foldable parts OPS-F is not limited thereto. In an exemplary embodiment, for example, the number of the foldable parts OPS-F according to the invention may be greater than or less than four.

The body OPS-B may have an overall rectangular shape including four edges EG1, EG2, EG3 and EG4. Each of the four edges EG1, EG2, EG3 and EG4 includes or defines a boundary line FL at which the foldable parts OPS-F respectively meet or contact the body OPS-B. However, the shape of the body OPS-B is not limited thereto. In an exemplary embodiment, for example, the body OPS-B may have a curved shape in which each of corners of the body OPS-B is rounded.

Each of the foldable parts OPS-F extends from a boundary line FL. Each of the foldable portions OPS-F may have a rectangular shape in the top plan view and have a similar shape to each other or the same shape as each other. However, the shape of each of the foldable parts OPS-F is not limited thereto. In an exemplary embodiment, for example, each of the foldable parts OPS-F may have a different shape from each other.

The boundary line FL is defined as a central portion of each of the four edges EG1, EG2, EG3 and EG4. Accordingly, the foldable parts OPS-F extend from the central portions of the corresponding edges EG1, EG2, EG3 and EG4, respectively.

A guide opening part or portion OPS-G may be defined in each of the foldable parts OPS-F. The role of the guide opening part OP-G will be described in detail in FIG. 7A to 7D below.

In a first direction DR1, each of the first edge EG1 and the third edge EG3 has or defines a length L1 (hereinafter, referred to as a first length) greater than a length L2 (hereinafter, referred to as a second length) defined by the foldable part OPS-F extending from the respective first edge EG1 or the third edge EG3. In a second direction, each of the second edge EG2 and the fourth edge EG4 has or defines a length L3 (hereinafter, referred to as a third length) greater than a length L4 (hereinafter, referred to as a fourth length) defined by the foldable part OPS-F extending from the respective second edge EG2 or the fourth edge EG4.

A length H1 of the foldable parts OPS-F respectively extending from the first edge EG1 and the third edge EG3 is measured in the second direction DR2, and a length H2 of the foldable parts OPS-F respectively extending from the second edge EG2 and the fourth edge EG4 is measured in the first direction DR1. Each length H1, H2, H3 and H4 is greater than the sum of a thickness of the light guide plate LGP (refer to FIG. 2A) measured in a third direction DR3 and a thickness of the bottom part BC-S (refer to FIG. 2A) of the bottom member BC (refer to FIG. 2A) measured in the third direction DR3.

Figure 4:
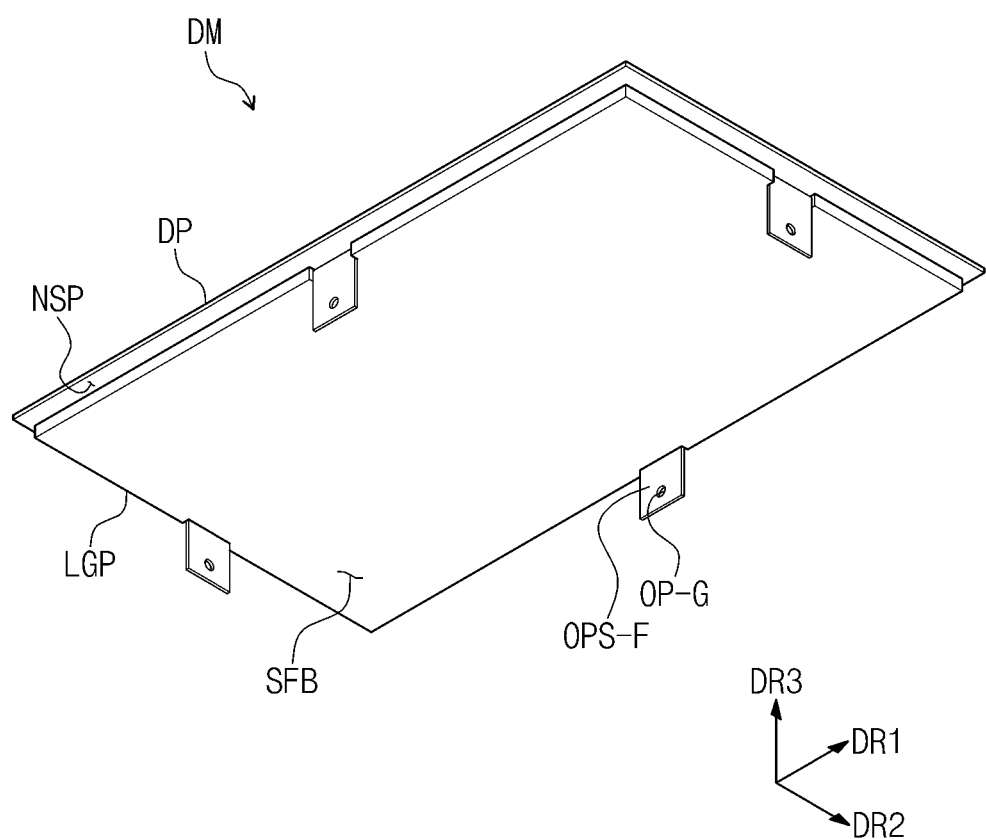
FIG. 4 is a perspective view illustrating an exemplary embodiment of a display module of the display device in FIG. 1.
Figure 5:
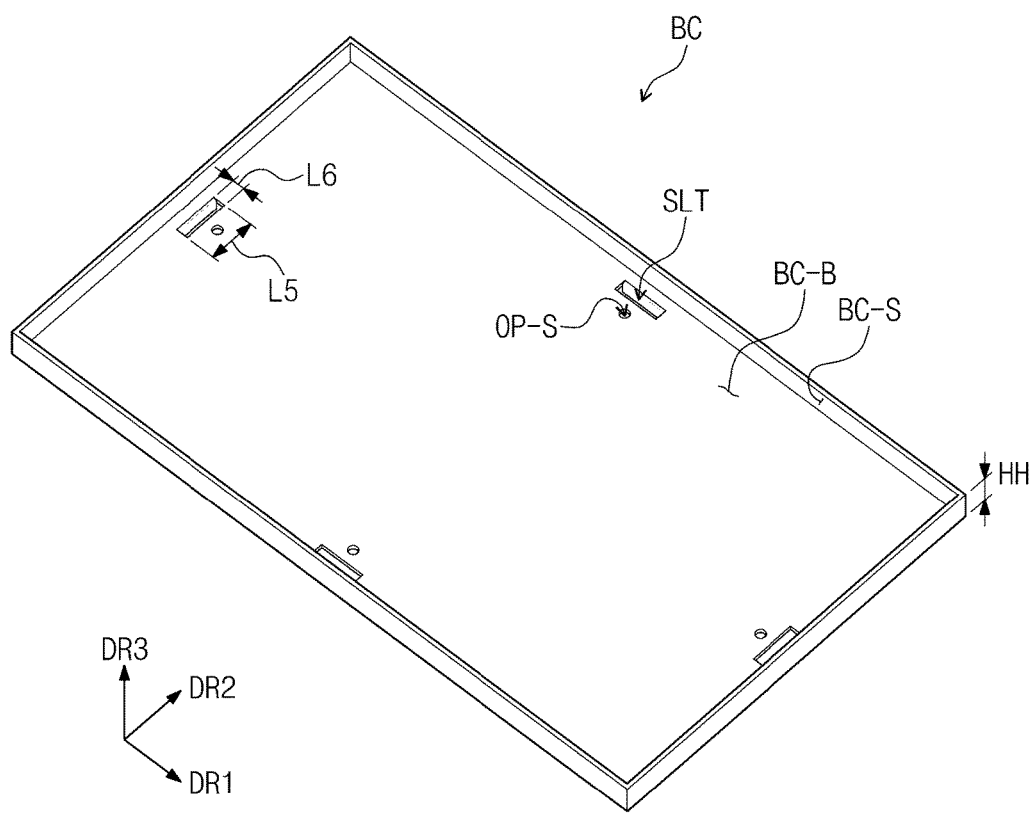
FIG. 5 is a perspective view illustrating an exemplary embodiment of a bottom member of the display device in FIG. 1.
Figure 6:
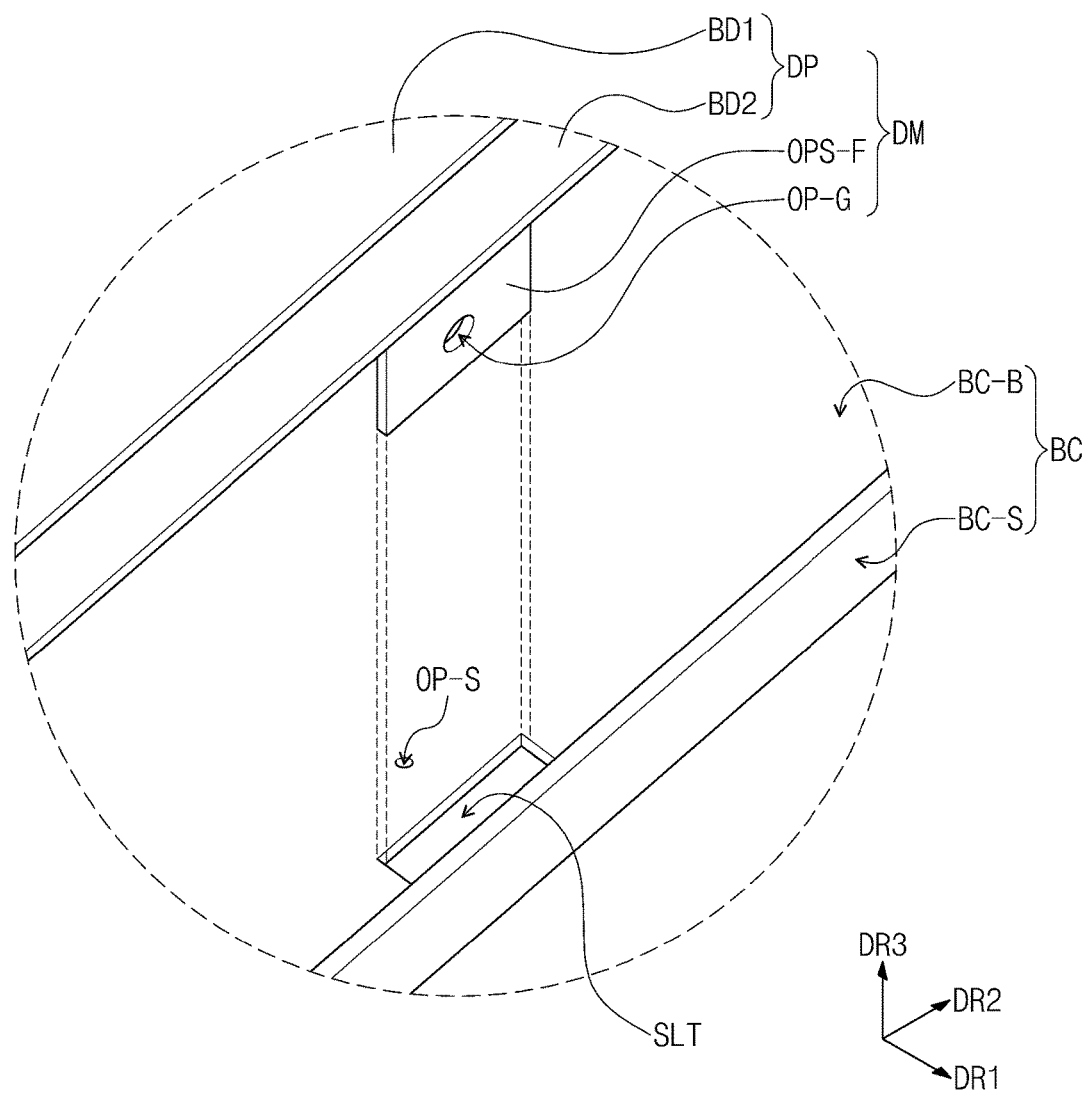
FIG. 6 is a perspective view illustrating an exemplary embodiment of a folded state of a portion of the optical sheet in FIG. 4 with respect to a slit of the bottom member in FIG. 5.

FIG. 4 is a perspective view illustrating an exemplary embodiment of a display module DM of the display device DD illustrated in FIG. 1. FIG. 5 is a perspective view illustrating an exemplary embodiment of the bottom member BC of the display device DD illustrated in FIG. 1. FIG. 6 is a perspective view illustrating an exemplary embodiment of a folded state of the foldable part OPS-F of the optical sheet OPS illustrated in FIG. 4 with respect to a slit SLT of the bottom member BC illustrated in FIG. 5.

The display module DM includes the display panel DP, the optical sheet OPS and the light guide plate LGP. In the perspective view illustrated in FIG. 4, which illustrates a shape of the display module DM when viewed from a lower portion of the display module DM, although not shown in the drawing, the body OPS-B of the optical sheet OPS is disposed between the display panel DP and the light guide plate LGP.

Unlike the un-folded state FIGS. 2A to 3, the foldable parts OPS-F of the optical sheet OPS in FIG. 4 are bent from the body OPS-B toward the bottom member BC in the third direction DR3. That is, the body OPS-B and the foldable parts OPS-F are angled at approximately 90° with respect to each other.

The display panel DP may be divided into an overlap area YSP (refer to FIG. 10) overlapping the body OPS-B of the optical sheet OPS and a non-overlap area NSP non-overlapping the body OPS-B of the optical sheet OPS. The optical sheet OPS exposes the non-overlap area NSP of the display panel DP.

Referring to FIGS. 5 and 6, a slit SLT respectively corresponding to the foldable parts OPS-F of the optical sheet OPS is defined in plurality in the bottom part BC-B of the bottom member BC.

Each of the slits SLT has a length L5 (hereinafter, referred as a fifth length) that is equal to or greater than the second length L2 (refer to FIG. 3) and the fourth length L4 (refer to FIG. 3). Also, each of the slits SLT has a width L6 taken perpendicular to the length L5 (hereinafter, referred to as a sixth length) that is equal to or greater than a thickness of the optical sheet OPS (refer to FIG. 2A) measured in the third direction DR3. Accordingly, the foldable parts OPS-F may be easily inserted into the corresponding slits SLT, respectively.

An opening OP-S provided in plural may be further defined in the bottom part BC-B of the bottom member BC. Each of the openings OP-S corresponds to a guide opening OP-G of the foldable part OPS-F.

A height HH of the sidewall BC-S of the bottom member BC measured in the third direction DR3 may be equal to or greater than a total thickness of the display module DM measured in the third direction DR3. Thus, the bottom member BC may stably accommodate the display module DM therein.

The foldable parts OPS-F of the display module DM are respectively inserted into the corresponding slits SLT of the bottom member BC to couple the display module DM to the bottom member BC.

As discussed above, forming a display device having a relatively small or minimal thickness or a display device having a relatively slim or minimized bezel may be difficult due to a separate mold frame to support the display panel of the display device. However, in one or more exemplary embodiment of the invention, since the foldable parts OPS-F of the display module DM are directly inserted into the corresponding slits SLT of the bottom member BC to couple the display panel DP to the bottom member BC, a separate mold frame to support the display panel DP is omitted.

That is, in one or more exemplary embodiment of the invention, since the separate mold frame is omitted, an area of the mold frame in the top plan view is omitted, such that a bezel around the display area of the display device DD is minimized. Furthermore, since the separate mold frame is omitted, a portion of the mold frame under the display panel DP to support the display panel DP is omitted such that an overall thickness of the display device DD is minimized.

FIGS. 7A, 7B, 7C and 7D are perspective views illustrating an exemplary embodiment of a process of coupling the foldable part OPS-F of the optical sheet OPS in FIG. 6 to the bottom member BC. Each of FIGS. 7A, 7B, 7C and 7D illustrates a rear surface of the bottom member BC illustrated in FIG. 6.

Figure 7A:
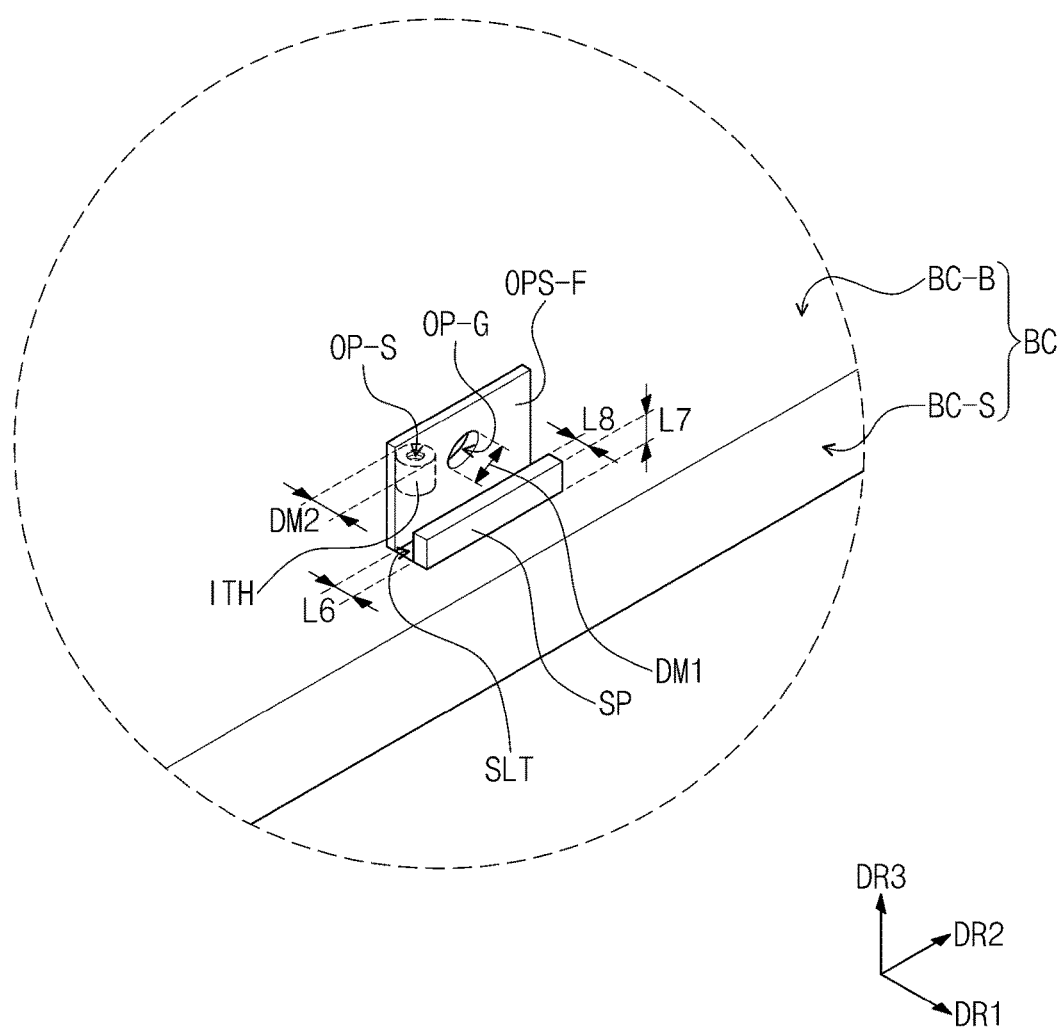
FIGS. 7A to 7D are perspective views illustrating an exemplary embodiment of a process of coupling the optical sheet to the bottom member in FIG. 6.

FIG. 7A illustrates a state in which the foldable part OPS-F of the display module DM (refer to FIG. 4) is inserted into the corresponding slit SLT. The bottom member BC may include a support member SP provided in plurality protruding from the bottom part BC-B in the third direction DR3. The foldable part OPS-F is disposed in a plane defined in the second and third directions DR2 and DR3.

The support members SP may be disposed to correspond to the slits SLT. According to an exemplary embodiment of the invention, each of the support members SP is provided or defined by a portion of the bottom part BC-B of the bottom member BC what has been cut and bent in the third direction DR3. Thus, a length L7 (hereinafter, referred to as a seventh length) of the support members SP measured in the third length DR3 is substantially the same as the sixth length L6 of the slit SLT. Also, each of the support members SP has a thickness L8 that is substantially the same as a thickness of the bottom part BC-B measured in the third direction DR3. That is, even though the slit SLT and the support member SP are provided in different planes, dimensions of the support members SP are identical to those of the slits SLT, respectively.

The bottom member BC may include a female fastener (hereinafter referred to as a female screw) ITH. Each of the female screws ITH protrudes from the bottom part BC-B in the third direction DR3. The screw opening OP-S is defined in each of the female screws ITH, which is aligned with the screw opening OP-S illustrated in FIG. 6. A screw curve or thread (not shown) for being coupled to a male fastener (hereinafter referred to as a male screw) OTH (refer to FIG. 7C) is defined in the screw opening OP-S.

The guide opening OP-G of the optical sheet OPS has a diameter DM1 that is equal to or greater than a diameter DM2 of the female screw ITH. Thus, the female screw ITH may be easily inserted into the corresponding guide opening OP-G.

Figure 7B:
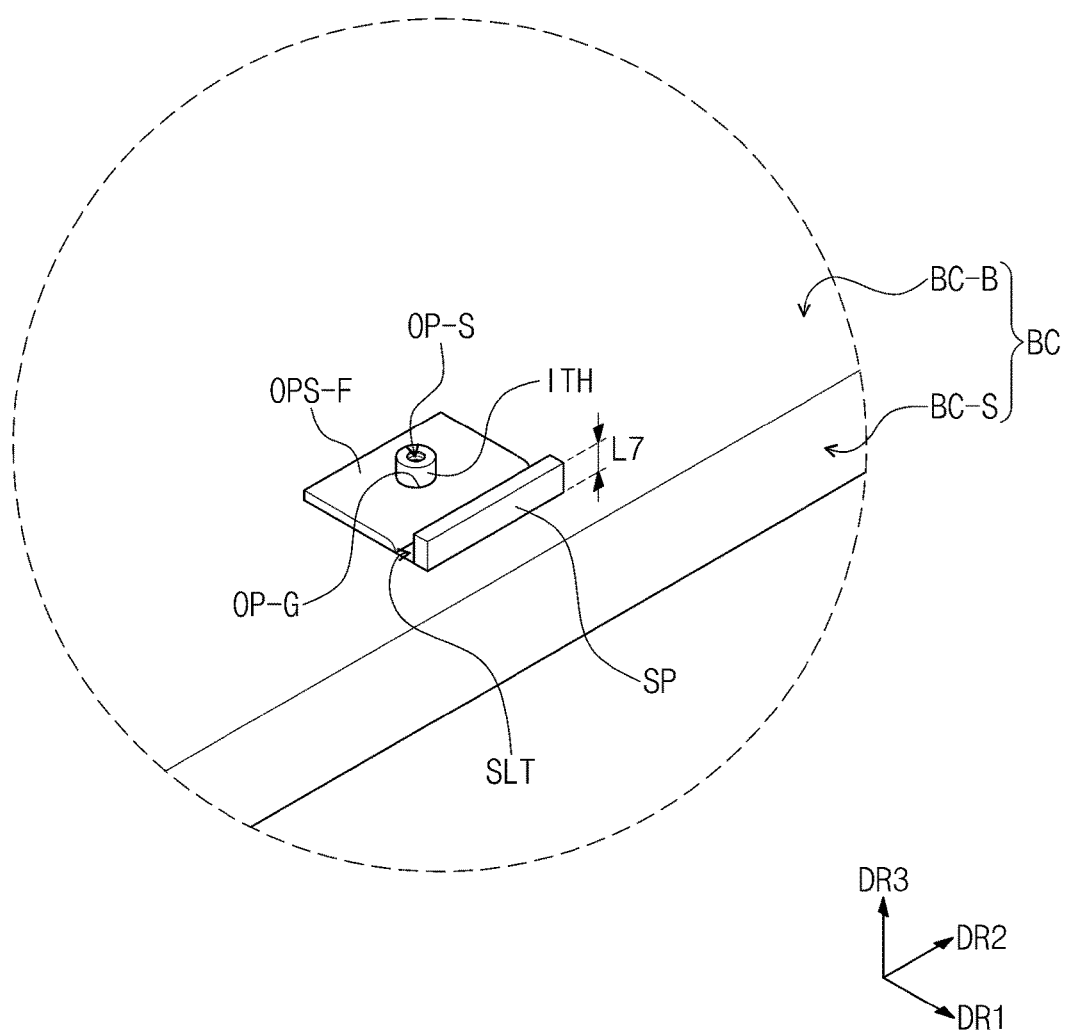

FIG. 7B illustrates a state in which the foldable part OPS-F is bent to insert the female screw ITH into the corresponding guide opening OP-G. From the plane defined in the second and third directions DR2 and DR3, the foldable part OPS-F is bent in the first direction DR2. The bent foldable part OPS-F is disposed to contact the bottom part BC-B with the female screw ITH protruding through the corresponding guide opening OP-G. The bent foldable part OPS-F is disposed in a plane parallel to that of the bottom part BC-B, that is, a plane defined by the first and second directions DR1 and DR22. Since the female screw ITH protrudes from the bottom part BC-B, the female screw ITH serves to guide the foldable part OPS-F to be exactly coupled to a desired position via the guide opening OP-G when the foldable part OPS-F is bent.

Since the seventh length L7 of the support member SP is greater than the thickness of the foldable part OPS-F in the third direction of FIG. 7B, damage to the foldable part OPS-F by external shock or the like may be reduced or effectively prevented.

Figure 7C:
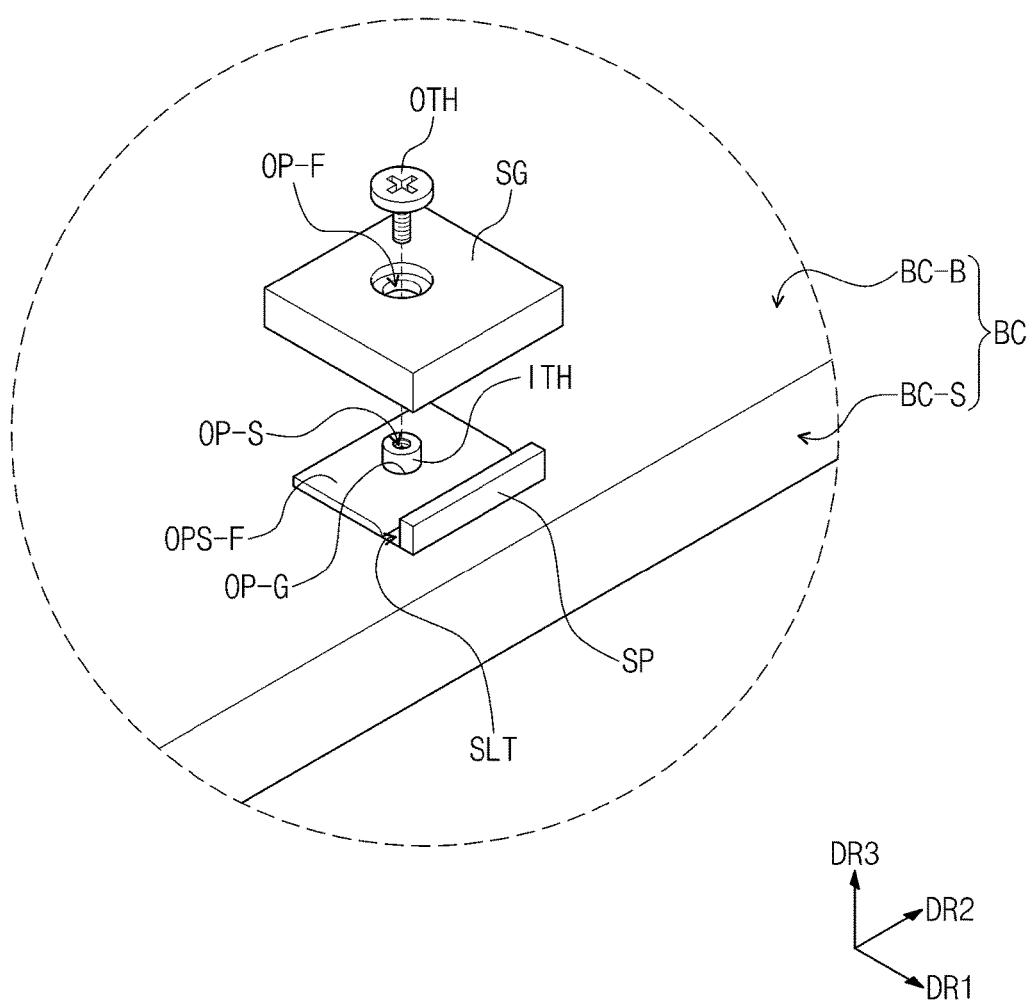
Figure 7D:
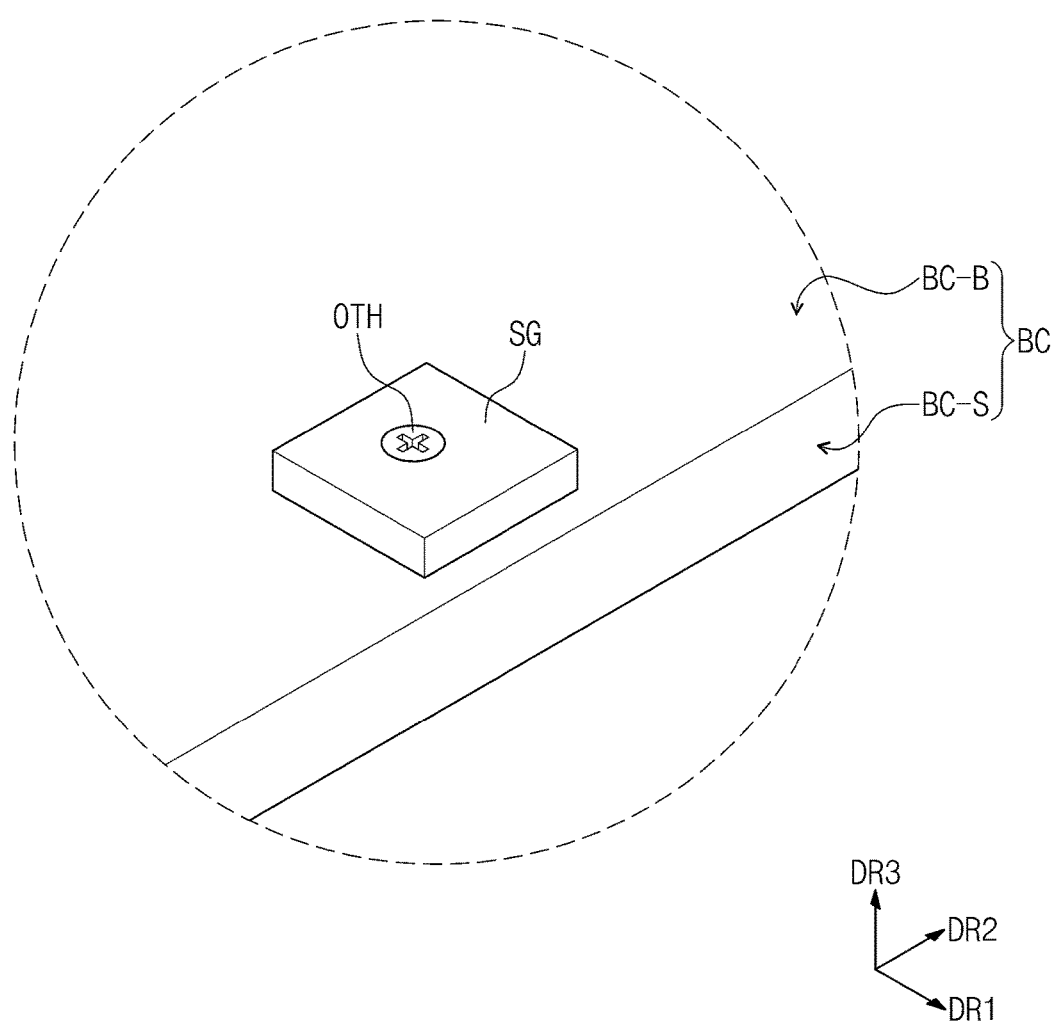

FIGS. 7C and 7D illustrate a state in which the foldable part OPS-F disposed parallel to and contacting the bottom part BC-B is fixed to the bottom part BC-B by using a protective member SG and the male screw OTH each respectively provided in plurality. The display device DD may further include a plurality of protective members SG and a plurality of male screws OTH.

The protective members SG are disposed on the corresponding foldable parts OPS-F, respectively. The protective member SG may also cover the corresponding support member SP. The protective members SG may reduce or effectively prevent the corresponding foldable parts OPS-F from external shock or the like, and increase coupling force between the foldable parts OPS-F and the bottom part BC-B.

A fixing opening OP-F overlapping and aligned with the corresponding female screw ITH and the corresponding male screw OTH is defined in each of the protective members SG. The corresponding female screw ITH and the corresponding male screw OTH may each be inserted into and aligned with the fixing opening OP-F.

As the male screw OTH passes through the fixing opening OP-F and is coupled to the screw opening OP-S of the female screw ITH, each of the foldable parts OPS-F of the optical sheet OPS is fixed to the bottom part BC-B of the bottom member BC. Accordingly, the display module DM (refer to FIG. 4) in which the display panel DP (refer to FIG. 4), the optical sheet OPS (refer to FIG. 4) and the light guide plate LGP (refer to FIG. 4) are coupled to each other, is coupled to the bottom member BC.

Figure 8:
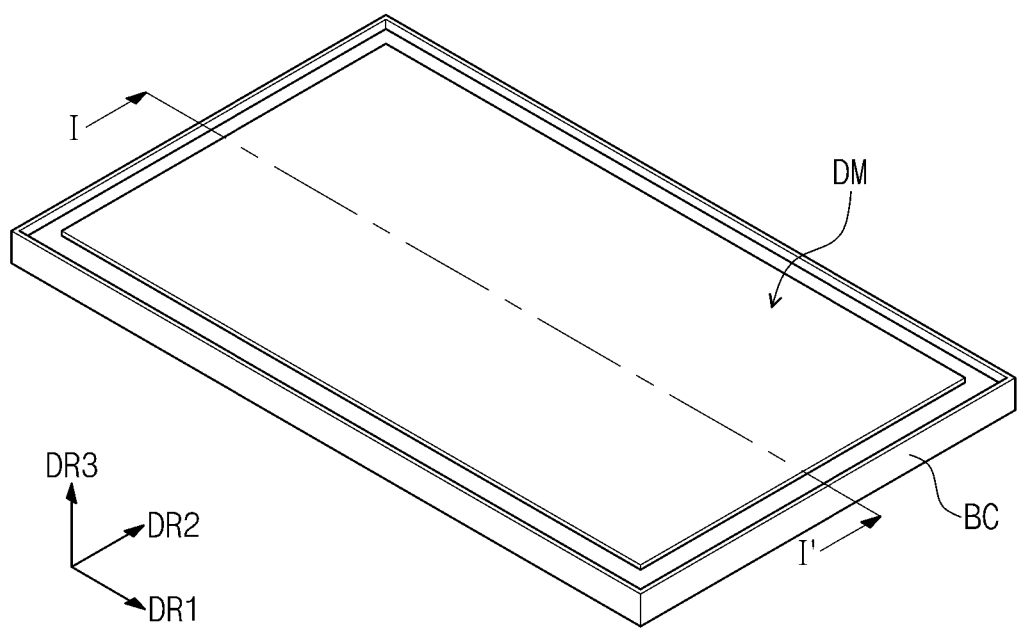
FIG. 8 is a perspective view illustrating an exemplary embodiment of an assembled state of the display module in FIG. 4 and the bottom member in FIG. 5.
Figure 9:
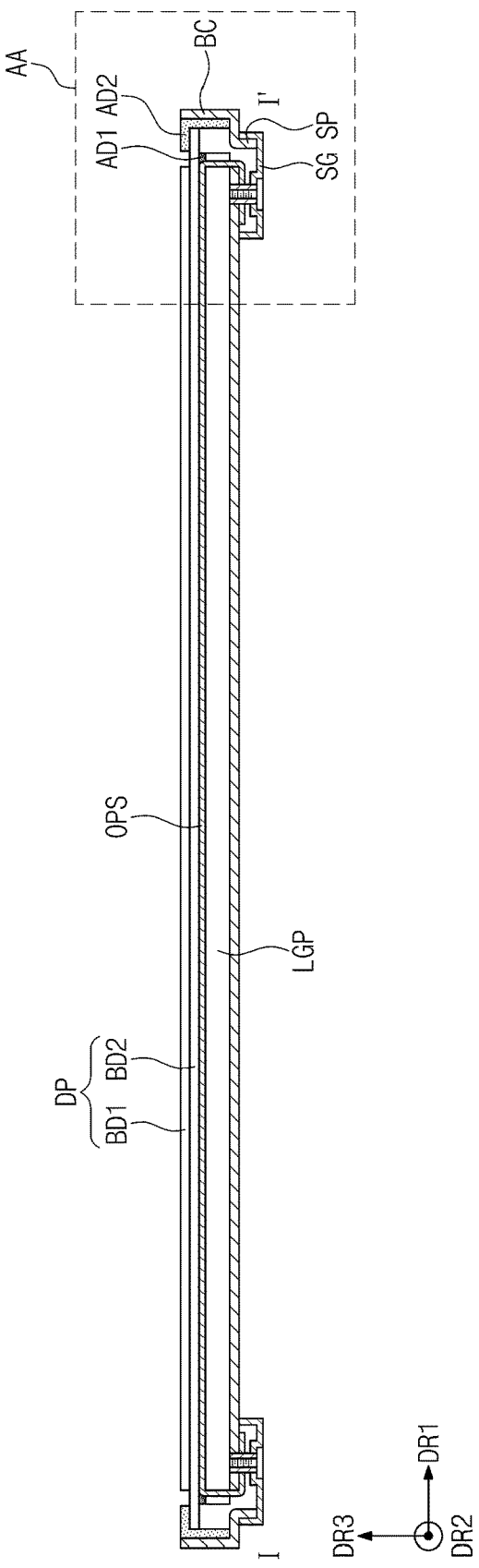
FIG. 9 is a cross-sectional view taken along line I-I' of FIG. 8.
Figure 10:
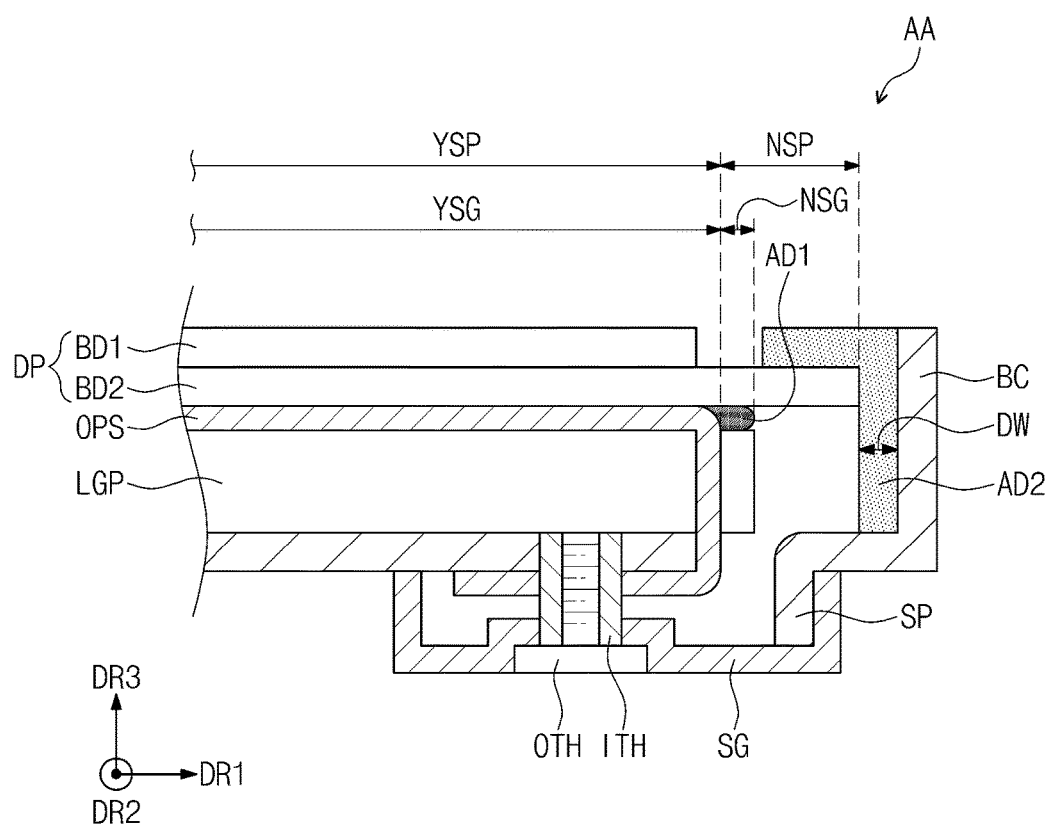
FIG. 10 is an enlarged cross-sectional view illustrating a portion AA in FIG. 9.

FIG. 8 is a perspective view illustrating an exemplary embodiment of an assembled state in which the display module DM in FIG. 4 and the bottom member BC in FIG. 5 are assembled with each other. FIG. 9 is a cross-sectional view taken along line I-I' of FIG. 8. FIG. 10 is an enlarged cross-sectional view illustrating a portion AA in FIG. 9. In more detail, FIGS. 9 and 10 illustrate the cross-section taken along line I-I' of FIG. 8 is viewed in the second direction DR2. Thus, the cross-section corresponding to the line I-I' and a portion of a view disposed behind the line I-I' are illustrated in FIGS. 9 and 10 for convenience of description.

A first adhesion member AD1 is disposed between the display panel DP and the light guide plate LGP. As the display panel DP and the light guide plate LGP are adhered to each other by the first adhesion member AD1, the optical sheet OPS is fixed between the display panel DP and the light guide plate LGP.

The display panel DP may be divided into the overlapped area YSP overlapping the body OPS-B (refer to FIG. 3) of the optical sheet OPS and a non-overlapped area NSP that does not overlap the body OPS-B (refer to FIG. 3) of the optical sheet OPS. The light guide plate LGP may be divided into an overlapped area YSG overlapping the body OPS-B (refer to FIG. 3) of the optical sheet OPS and a non-overlapped area NSG that does not overlap the body OPS-B (refer to FIG. 3) of the optical sheet OPS. According to an exemplary embodiment of the invention, the first adhesion member AD1 is disposed between the non-overlapped area NSP of the display panel DP and the non-overlapped area NSP of the light guide plate LGP.

A predetermined space DW may be defined between the second display substrate BD2 of the display panel DP and the bottom member BC. As a second adhesion member AD2 is disposed in the space DW, a top surface of the second display substrate BD2 may be adhered to the bottom member BC.

According to an exemplary embodiment of the invention, each of the first adhesion member AD1 and the second adhesion member AD2 is adhesive that is in a liquid state when firstly applied and then solidified to be converted into a solid state.

Figure 11:
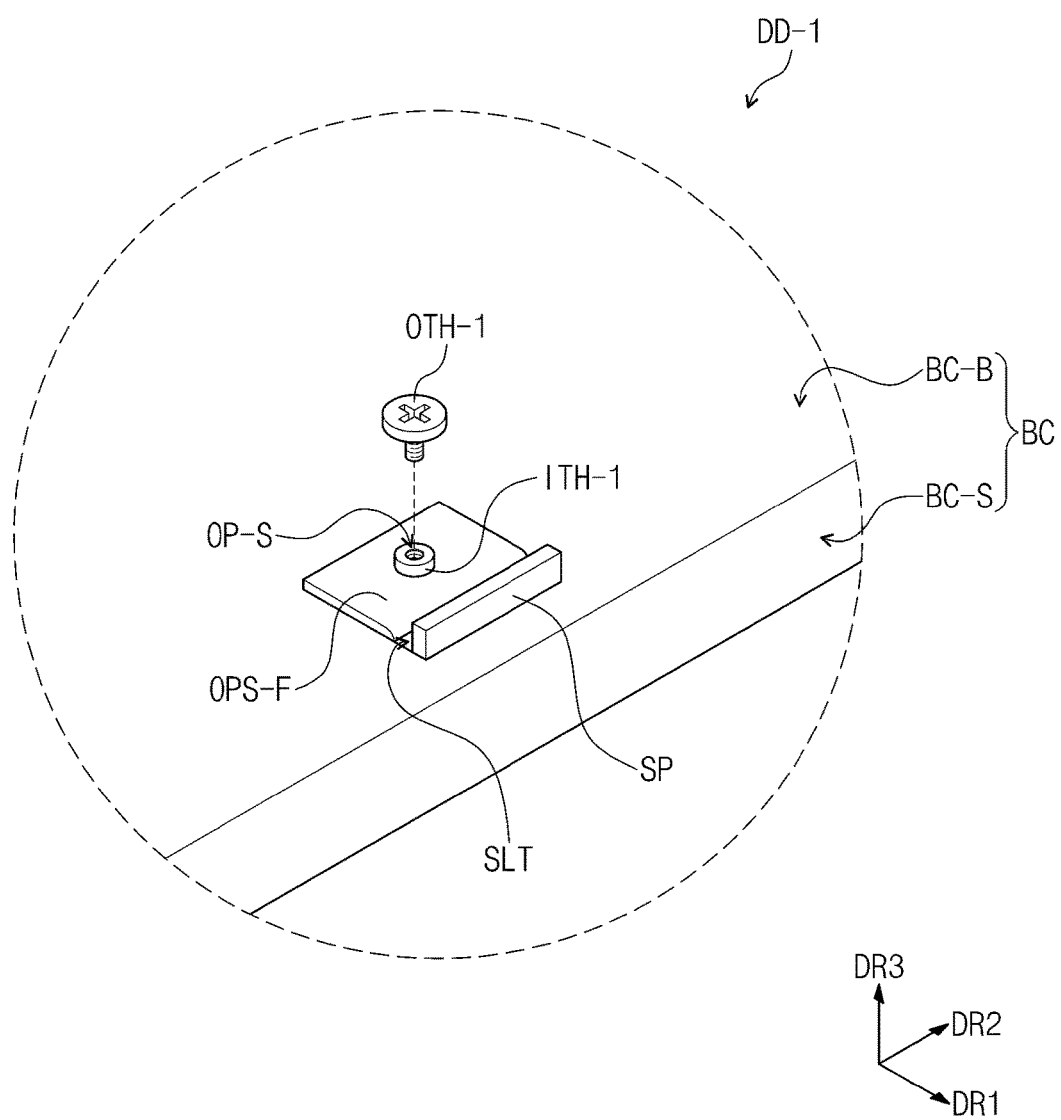
FIG. 11 is a perspective view illustrating an exemplary embodiment of a method of coupling an optical sheet to a bottom member for a display device according to the invention.

FIG. 11 is a perspective view illustrating an exemplary embodiment of a method of coupling the optical sheet OPS to the bottom member BC for a display device DD-1 according to the invention.

The method of coupling the optical sheet OPS to the bottom member BC in FIG. 11 includes the protective member SG omitted from the method of coupling the optical sheet OPS to the bottom member BC in FIGS. 7A to 7D.

Since description regarding the bottom member BC, the foldable part OPS-F, the support member SP, the slit SLT and the screw opening OP-S is the same as that in FIGS. 7A to 7D, the overlapped description will be omitted.

The function and role of a female screw ITH-1 and a male screw OTH-1 are the same as those described in FIGS. 7A to 7D. However, since the protective member SG is omitted, the female screw ITH-1 and the male screw OTH-1 have lengths less than those of the female screw ITH and the male screw OTH in FIGS. 7A to 7D. Accordingly, the female screw ITH-1 and the male screw OTH-1 may be coupled to each other to fix a foldable part OPS-F to a bottom part BC-B. The female screw ITH-1 and the male screw OTH-1 may be exposed at the rear side of the bottom member BC since the protective member is omitted.

Since the protective member SG is removed and the foldable part OPS-F is fixed to the bottom part BC-B through only the coupling of the female screw ITH-1 and the male screw OTH-1 in the display device DD-1 in FIG. 11, the display device DD-1 may have an overall thickness and weight, which are less than those of the display device DD in FIGS. 7A to 7D.

Figure 12:
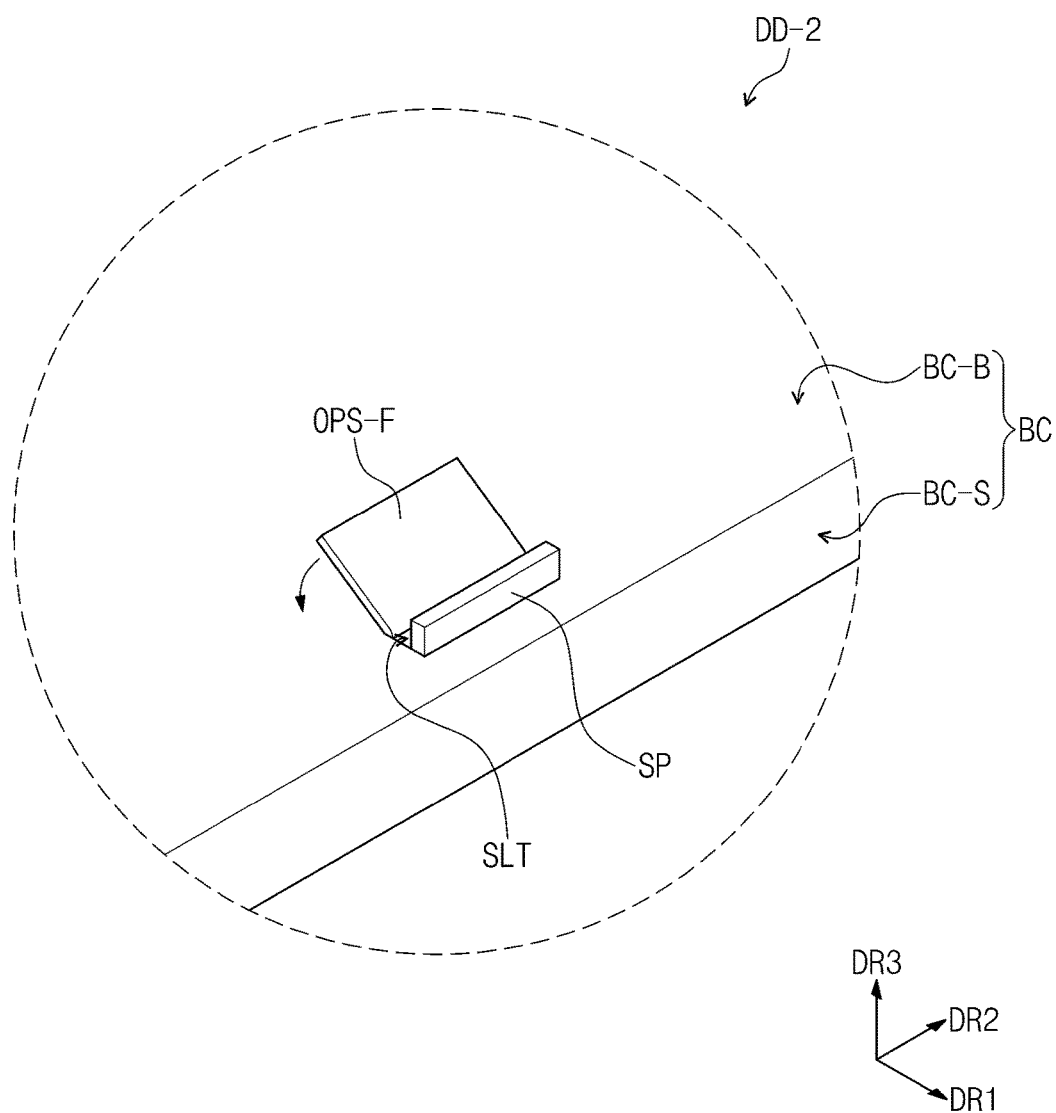
FIG. 12 is a perspective view illustrating another exemplary embodiment of a method of coupling an optical sheet to a bottom member for a display device according to the invention.

FIG. 12 is a perspective view illustrating another exemplary embodiment of a method of coupling the optical sheet OPS to the bottom member BC in a display device DD-2 according to the invention. Since description regarding the bottom member BC, the foldable part OPS-F, the support member SP and the slit SLT is the same as that in FIGS. 7A to 7D, the overlapped description will be omitted. In the coupling method in FIG. 12, the guide opening OP-G of the foldable part OPS-F and the screw opening OP-S of the bottom part BC-B may not be defined.

The display device DD-2 in FIG. 12 uses an adhesion member (not shown) to directly adhere the foldable part OPS-F to the bottom part BC-B. Here, the adhesion member may be one of adhesive in a liquid state, silicon, or a double-sided tape. With the foldable part OPS-F bent toward the rear side of the bottom part BC-B (see arrow in FIG. 12), the adhesion member is disposed between the bottom part BC-B and the bent foldable part OPSF to couple the foldable part OPS-F to the bottom part BC-B.

Unlike the display device DD-1 in FIG. 11, as the display device DD-2 in FIG. 12 does not use the female screw ITH and the male screw OTH, the display device DD-2 may have an overall thickness and weight, which are less than those of the display device DD-1 in FIG. 11.

Figure 13:
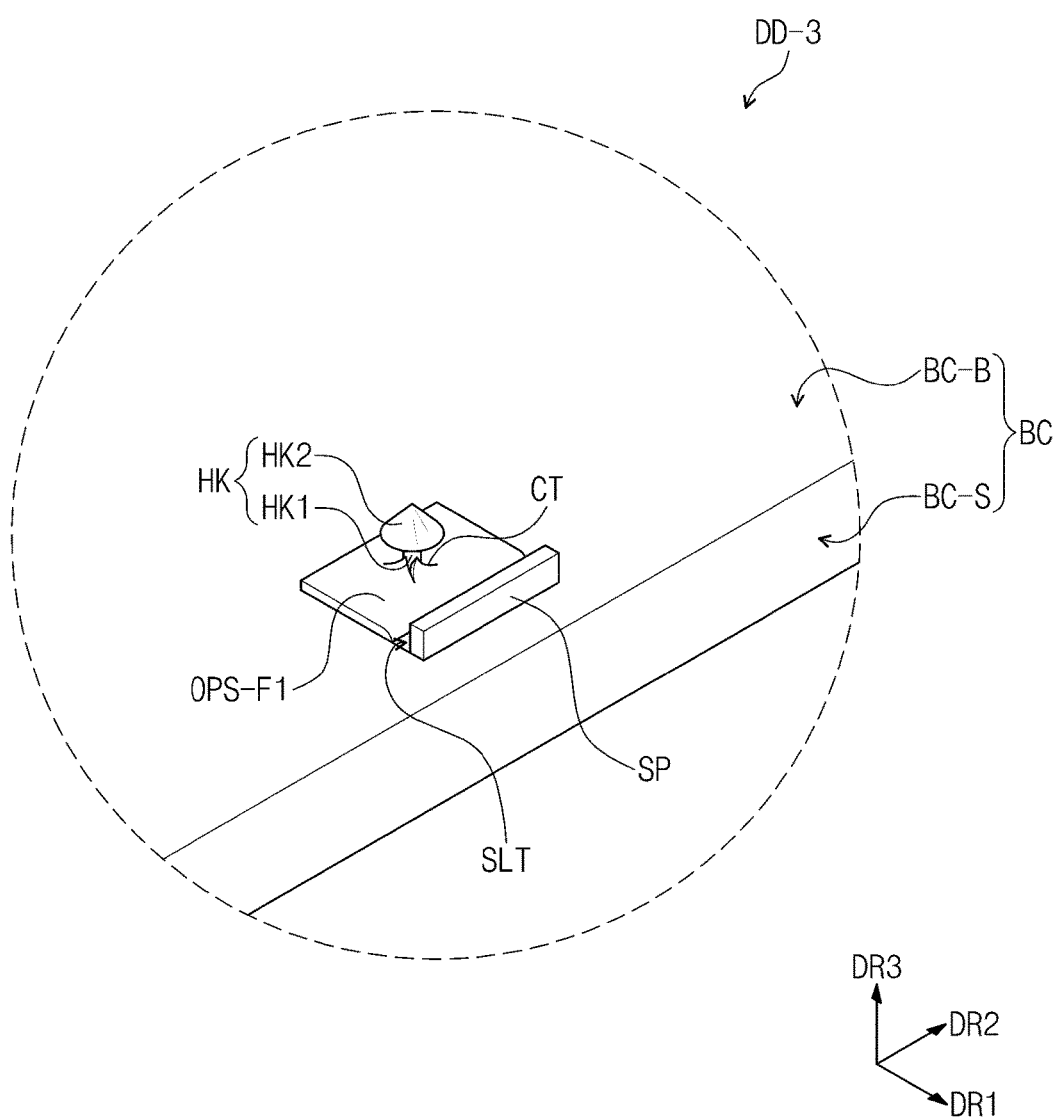
FIG. 13 is a perspective view illustrating still another exemplary embodiment of a method of coupling an optical sheet to a bottom member for a display device according to the invention.

FIG. 13 is a perspective view illustrating still another exemplary embodiment of a method of coupling the optical sheet OPS to the bottom member BC in a display device DD-3 according to the invention. Since description regarding the bottom member BC, the support member SP and the slit SLT is the same as that in FIGS. 7A to 7D, the overlapped description will be omitted.

Unlike the foldable part OPS-F in FIGS. 7A to 7D, a slit or cut-away portion CT is defined in the foldable part OPS-F1 instead of the guide opening OP-G. The cut-away portion CT may extend through an entire thickness of the foldable part OPS-F1. The foldable part OPS-F1 is hook-coupled via the cut-away portion CT.

The bottom member BC may include a hook portion HK (hereinafter referred to as a hook) provided in plurality each of which includes a first hook (portion) HK1 and a second hook (portion) HK2. Each of the hooks HK protrudes from the bottom part BC-B.

The first hook HK1 has a constant circumference along the length in the third direction DR3. The first hook HK1 serves to fix the foldable part OPS-F1 inserted into the hook HK.

The second hook HK2 may have a cone shape for which a circumference gradually decreases along a length of the second hook HK2 in a direction away from the bottom part BC-B in the third direction DR3. When the hook HK is inserted into the cut-away portion CT of the foldable part OPS-F1, the hook HK is easily inserted due to a sharp shape of an upper portion of the second hook HK2. After the hook HK is inserted into the cut-away portion CT of the foldable part OPS-F1, portions of the foldable part OPS-F1 at the cut-away portion CT are disposed around the smaller circumference first hook HK1 such that the foldable part OPS-F1 remains disposed between a lower surface of the second hook HK2 and the bottom part BC-B to be fixed to the hook HK due to a wide area of a lower portion of the second hook HK2.

In the display device DD-3 in FIG. 13, the foldable part OPS-F1 may be simply fixed to the bottom part BC-B by using less separate elements (screws, etc.) in comparison to the display devices DD, DD-1 and DD-2, which are previously described, through the process of directly inserting the foldable part OPS-F1 onto the hook HK.

Figure 14:
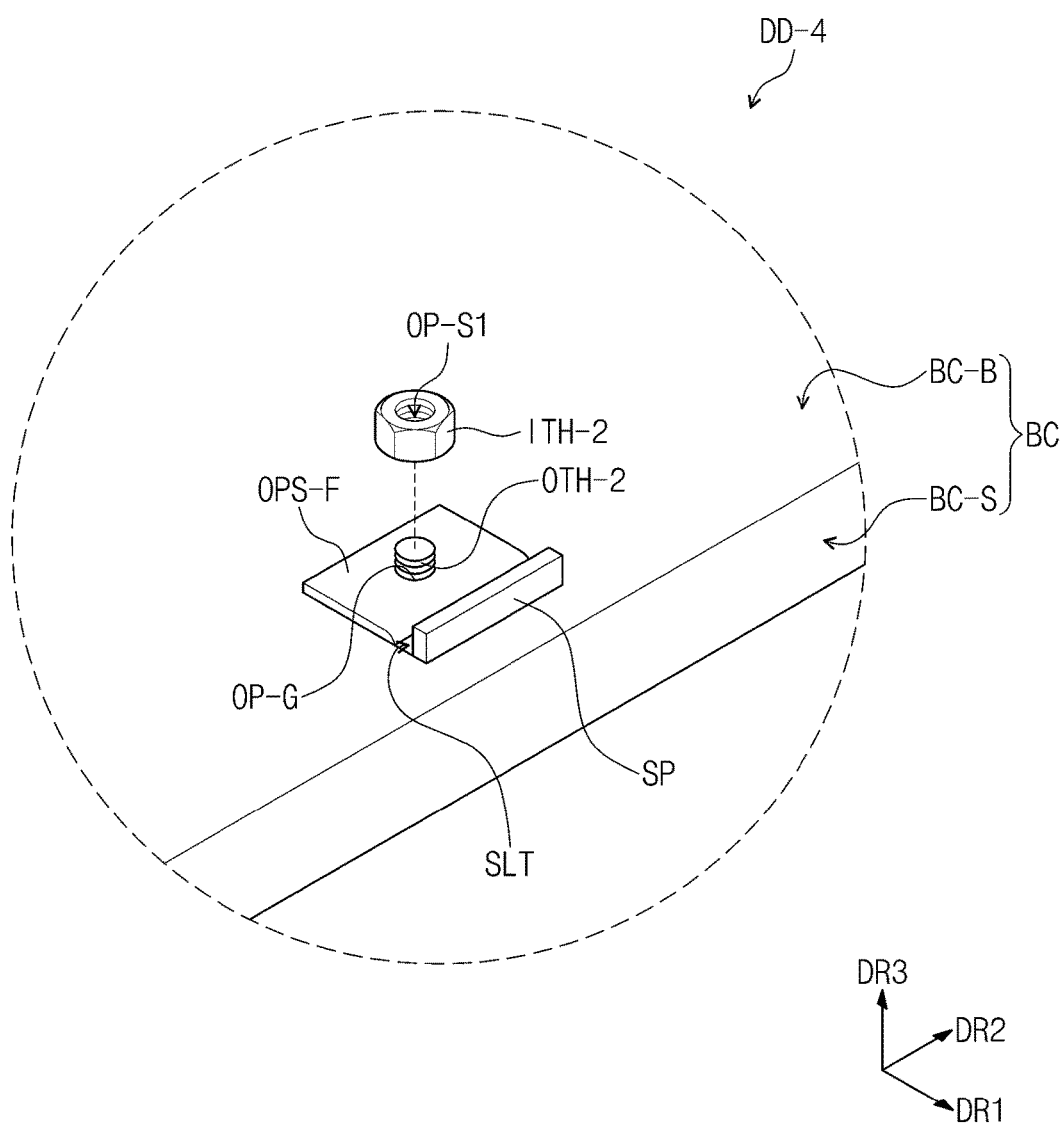
FIG. 14 is a perspective view illustrating yet another exemplary embodiment of a method of coupling an optical sheet to a bottom member for a display device according to the invention.

FIG. 14 is a perspective view illustrating yet another exemplary embodiment of a method of coupling the optical sheet OPS to the bottom member BC in a display device DD-4 according to the invention. Since description regarding the bottom member BC, the support member SP, the slit SLT and the foldable part OPS-F is the same as that in FIGS. 7A to 7D, the overlapped description will be omitted.

The bottom member BC may include a male screw portion (hereinafter referred to as a male screw) OTH-2 provided in plurality. Each of the male screws OTH-2 protrudes from the bottom part BC-B. Each of the male screws OTH-2 is inserted into the guide opening OP-G of the corresponding foldable part OPS-F.

The display device DD-4 may further include a female screw portion (hereinafter referred to as a female screw) ITH-2 provided in plurality. The female screws ITH-2 correspond to the male screws OTH-2, respectively. A screw opening OP-S1 is defined in each of the female screws ITH-2. A screw curve or thread (not shown) for being coupled to the male screw OTH-2 is defined in the screw opening OP-S1.

As the male screws OTH-2 passes through the guide opening OP-G and is coupled to the screw opening OP-S1 of the corresponding female screw ITH-2, the foldable part OPS-F is fixed to the bottom part BC-B.

Figure 15:
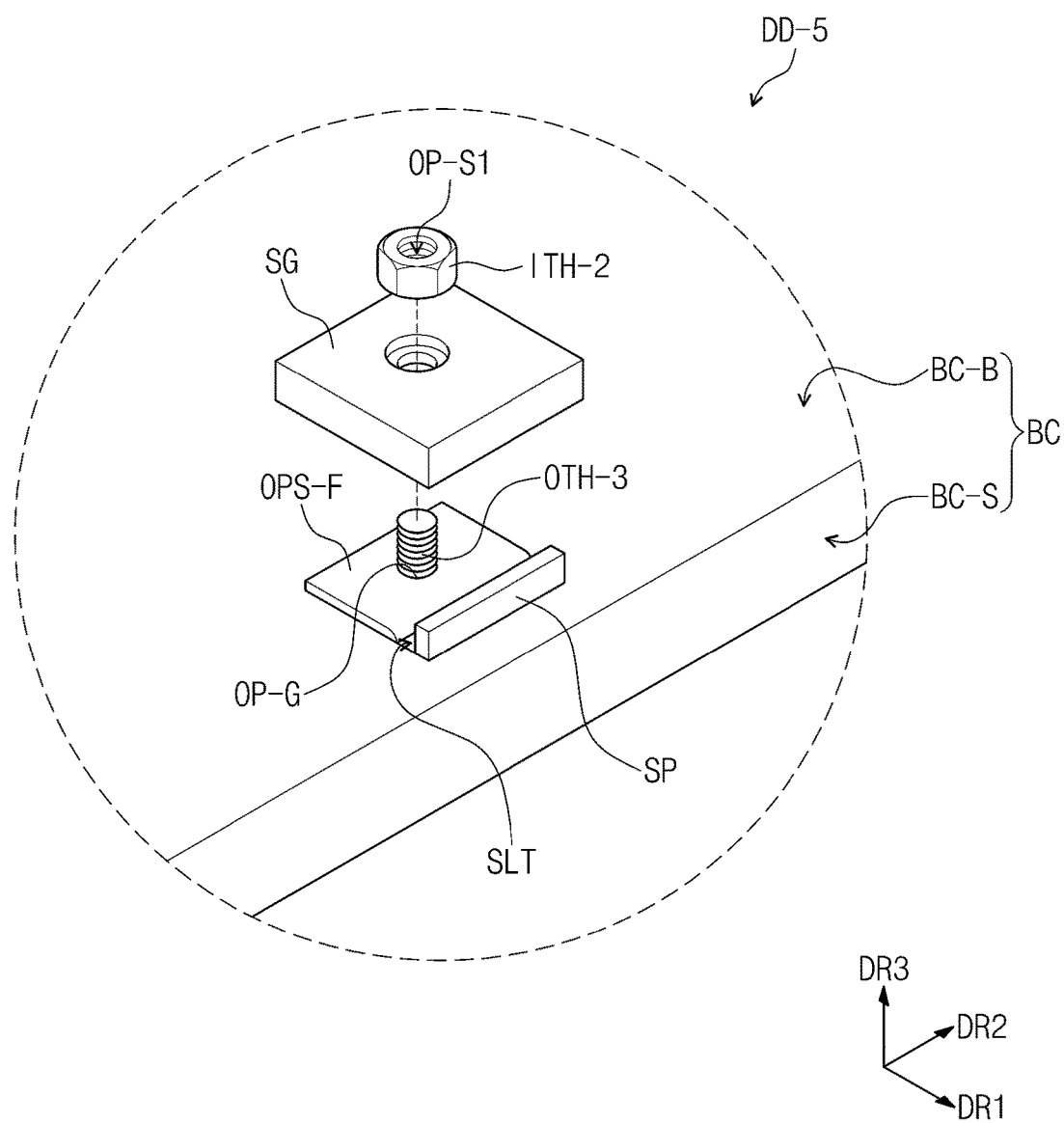
FIG. 15 is a perspective view illustrating yet another exemplary embodiment of a method of coupling an optical sheet to a bottom member for a display device according to the invention.

FIG. 15 is a perspective view illustrating yet another exemplary embodiment of a method of coupling the optical sheet OPS to the bottom member BC in a display device DD-5 according to the invention.

The display device DD-5 is the device in which a protective member SG is added to the display device DD-4 in FIG. 14. Since description regarding the protective member SG are the same as that in FIGS. 7A to 7D, the overlapped description will be omitted.

Since the protective member SG is added, a male screw portion (hereinafter referred to as a male screw) OTH-3 has a length greater than that of the male screw OTH-2 in FIG. 14.

Figure 16:
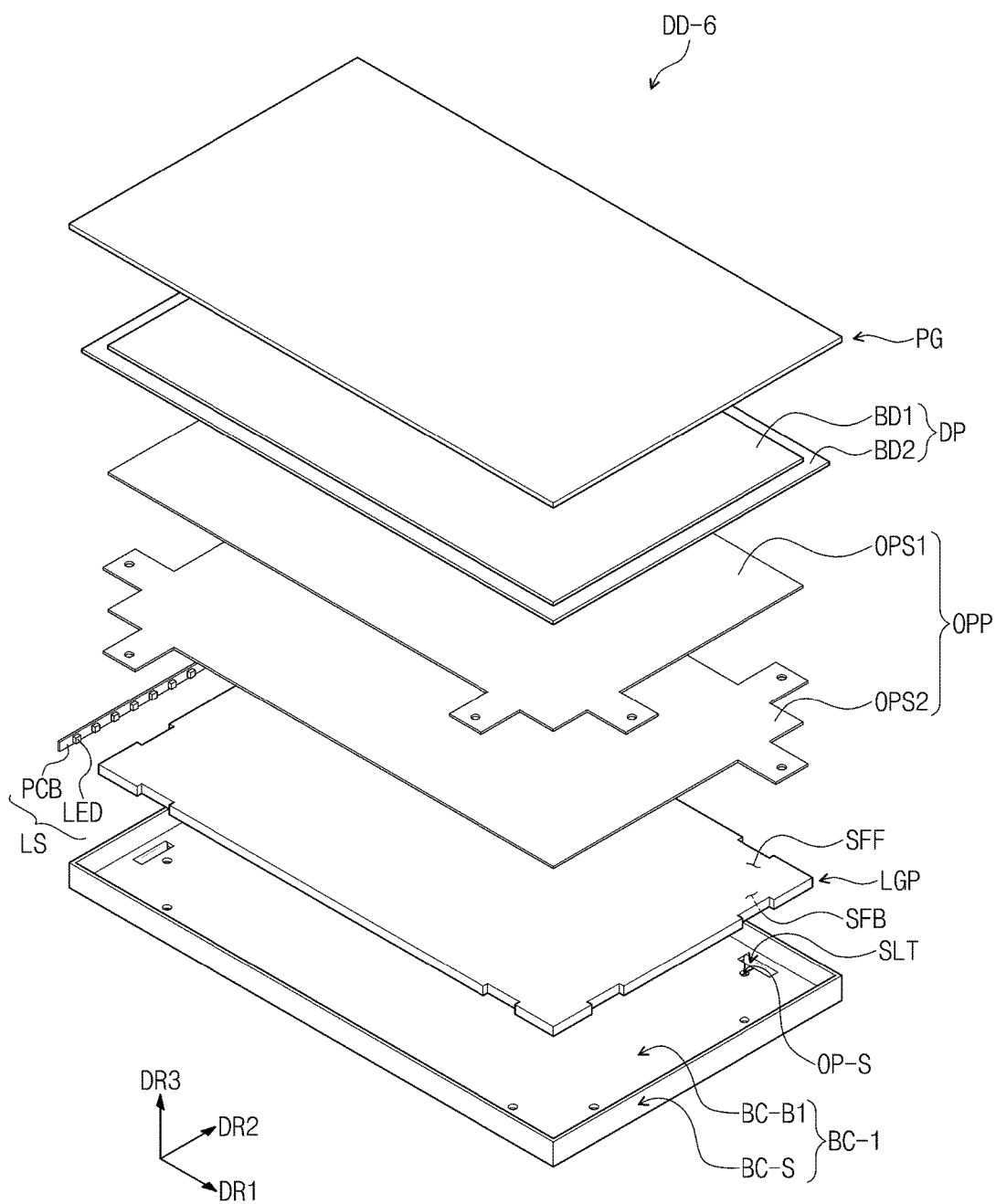
FIG. 16 is an exploded perspective view illustrating another exemplary embodiment of a display device according to the invention.
Figure 17A:
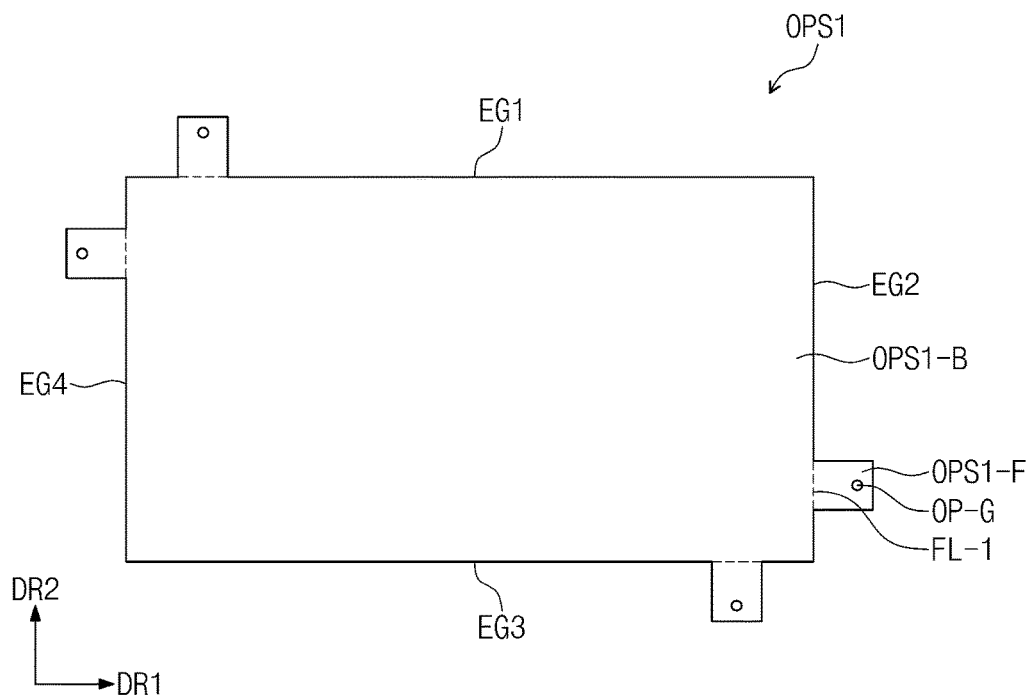
FIGS. 17A and 17B are top plan views respectively illustrating exemplary embodiments of an optical sheet of the display device in FIG. 16.
Figure 17B:
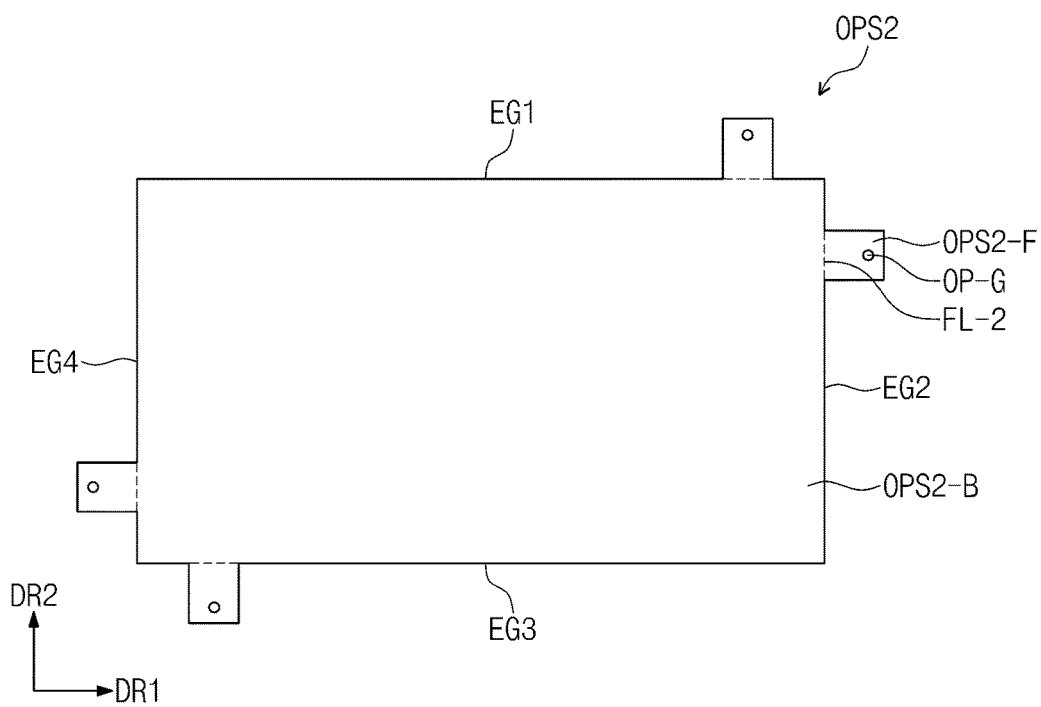

FIG. 16 is an exploded perspective view of another exemplary embodiment of a display device DD-6 according to the invention. FIGS. 17A and 17B are top plan views respectively illustrating exemplary embodiments of optical sheets OPS1 and OPS2 of the display device in FIG. 16.

As illustrated in FIG. 16, the display device DD-6 includes a protective glass PG, a display panel DP, a light guide plate LGP, a light source LS, an optical member OPP and a bottom member BC-1.

Since description regarding the protective glass PG, the display panel DP, the light guide plate LGP and the light source LS is the same as that in FIGS. 1 to 2B, the overlapped description will be omitted.

The optical member OPP includes a first optical sheet OPS1 and a second optical sheet OPS2. The first optical sheet OPS1 and the second optical sheet OPS2 may be differently selected from among a diffuser, a horizontal prism sheet, a vertical prism sheet or a brightness enhancement film. Since description regarding the diffuser, the horizontal prism sheet, the vertical prism sheet and the brightness enhancement film is the same as that in FIGS. 1 to 2B, the overlapped description will be omitted. The kind of the optical sheets OPS1 and OPS2 is not limited thereto. In an exemplary embodiment, for example, each of the optical sheets OPS1 and OPS2 may be a different kind of sheet for varying or enhancing a characteristic of incident light.

The optical member OPP may further include an adhesion sheet (not shown). Also, the optical member OPP may further include another optical sheet that is not shown in addition to the first and second optical sheets OPS1 and OPS2.

A slit SLT is provided in plurality respectively corresponding to the foldable parts OPS1-F and OPS2-F of the optical sheets OPS1 and OPS2 are defined in a bottom part BC-B1 of the bottom member BC-1. The plurality of slits SLT may be divided into first slits respectively corresponding to the first foldable parts OPS1-F and second slits respectively corresponding to the second foldable parts OPS2-F. Each of the first slits may have a shape that is the same as that of each of the second slits.

A recessed groove (HM in FIGS. 2A and 2b) corresponding to the foldable parts OPS1-F and OPS2-F may be defined in the light guide plate LGP. The groove may be recessed from a side surface of the light guide plate LGP at a corresponding edge of the optical member OPP. The recessed groove may serve to guide the foldable parts OPS1-F and OPS2-F in a foldable part bending process in a method of manufacturing a display device.

A screw opening OP-S may be further provided in plurality defined in the bottom part BC-B1 of the bottom member BC. The screw openings OP-S correspond to guide openings OP-G of each of the foldable parts OPS1-F and OPS2-F, respectively.

The foldable parts OPS1-F and OPS2-F are respectively inserted into the corresponding slits SLT to couple the optical member OPP to the bottom member BC-1. The foldable parts OPS1-F and OPS2-F may each be provided in plurality for the first optical sheet OPS1 and the second optical sheet OPS2, respectively.

FIG. 17A illustrates a top plan view of the first optical sheet OPS1, and FIG. 17B illustrates a top plan view of the second optical sheet OPS2.

Referring to FIG. 17A, the first optical sheet OPS1 includes a first body OPS1-B and a plurality of first foldable parts OPS1-F which extend from the first body OPS1-B. Since description regarding the first body OPS1-B and the first foldable parts OPS1-F is the same as that regarding the body OPS-B and the foldable parts OPS-F in FIG. 3, the overlapped description will be omitted.

According to an exemplary embodiment of the invention, a boundary line FL-1 at which the first body OPS1-B and the first foldable parts OPS1-F meet or contact each other is respectively disposed on an upper left portion and a lower right portion of the first optical sheet OPS1 at edges EG1, EG2, EG3 and EG4 of the first body OPS1-B. Accordingly, the first foldable parts OPS1-F extend from the upper left portion and the lower right portion of the first body OPS1-B, respectively.

Referring to FIGS. 16 and 17B, the second optical sheet OPS2 is disposed below the first optical sheet OPS1 in the third direction DR3. The second optical sheet OPS2 includes a second body OPS2-B and a plurality of second foldable parts OPS2-F which extend from the second body OPS2-B. Since description regarding the second body OPS2-B and the second foldable parts OPS2-F is the same as that regarding the body OPS-B and the foldable parts OPS-F in FIG. 3, the overlapped description will be omitted.

According to an exemplary embodiment of the invention, a boundary line FL-2 at which the second body OPS2-B and the second foldable parts OPS2-F meet or contact each other are respectively disposed on an upper left portion and a lower right portion of the second optical sheet OPS2 at edges EG1, EG2, EG3 and EG4 of the second body OPS2-B. Accordingly, the second foldable parts OPS2-F extend from the upper left portion and the lower right portion of the second body OPS1-B, respectively.

Referring to FIGS. 16, 17A and 17B, the second body OPS2-B overlaps the first body OPS1-B in the third direction DR3. Each of the first body OPS1-B and the second body OPS2-B may have the same shape and size as each other.

Since positions to which the first foldable parts OPS1-F and the second foldable parts OPS2-F respectively extend with respect to the bodies OPS1-B and OPS2-B are different from each other, the first foldable parts OPS1-F do not overlap the second foldable parts OPS2-F in the third direction DR3.

A respective coupling of the non-overlapping first and second foldable parts OPS1-F and OPS2-F at the rear side of the bottom member BC-1 may include any of the aforementioned processes or methods of coupling an optical sheet to a bottom member of a display device.

Figure 18:
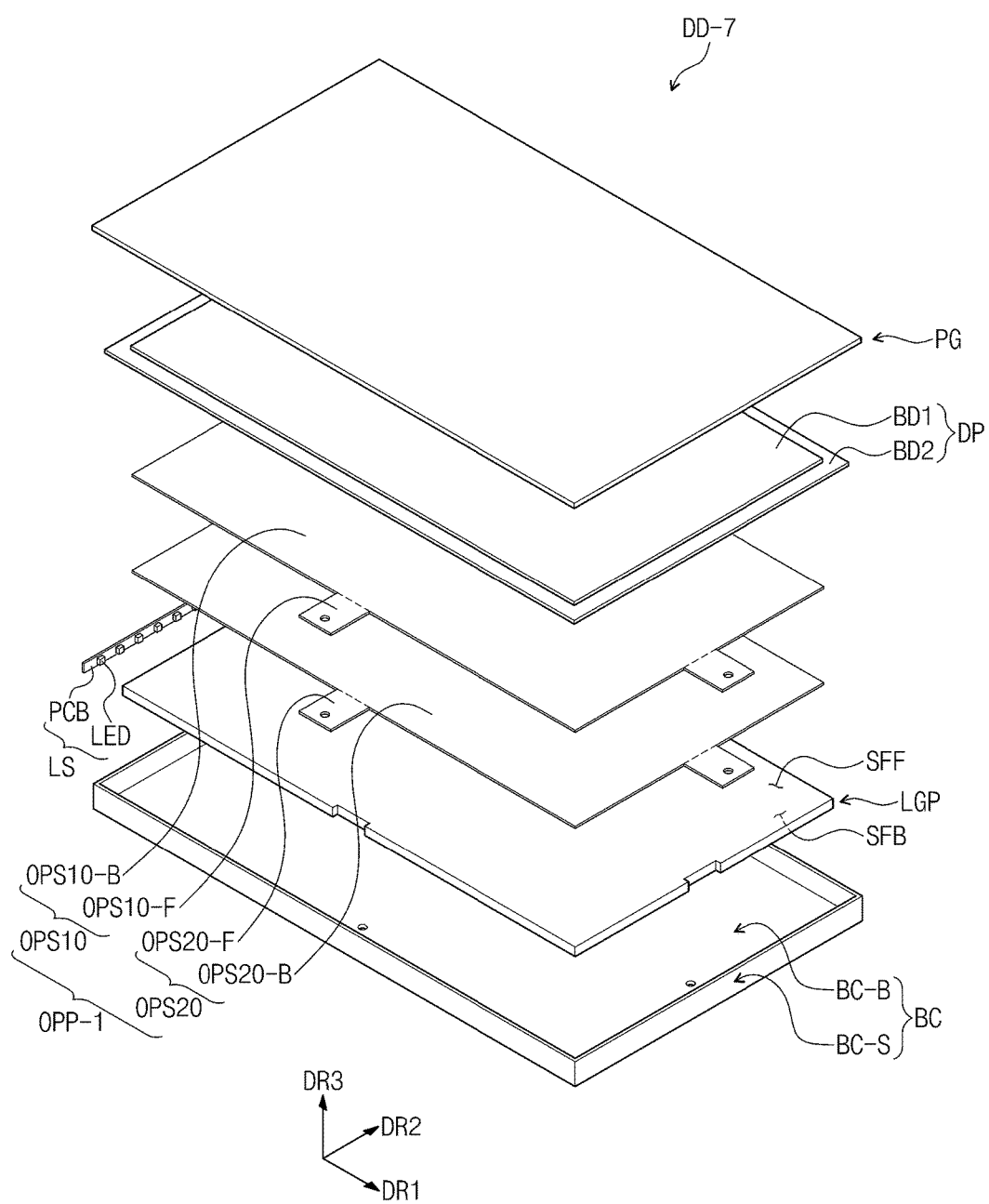
FIG. 18 is an exploded perspective view illustrating still another exemplary embodiment of a display device according to the invention.

FIG. 18 is an exploded perspective view of still another exemplary embodiment of a display device DD-7 according to the invention. As illustrated in FIG. 18, the display device DD-7 includes a protective glass PG, a display panel DP, a light guide plate LGP, a light source LS, an optical sheet OPP-1, and a bottom member BC.

Since description regarding the protective glass PG, the display panel DP, the light guide plate LGP and the light source LS is the same as that in FIGS. 1 to 2B, the overlapped description will be omitted. Since description regarding the bottom member BC is the same as that in FIG. 5, the overlapped description will be omitted.

The optical member OPP-1 includes a first optical sheet OPS10 and a second optical sheet OPS20. The first optical sheet OPS10 and the second optical sheet OPS20 may be differently selected from among the diffuser, the horizontal prism sheet, the vertical prism sheet or the brightness enhancement film.

The first optical sheet OPS10 includes a first body OPS10-B and a plurality of first foldable parts OPS10-F which is extended from the first body OPS10-B. The second optical sheet OPS20 includes a second body OPS20-B and a plurality of second foldable parts OPS20-F which is extended from the second body OPS20-B.

The second body OPS20-B overlaps the first body OPS10-B in the third direction DR3. The second foldable parts OPS20-F overlap the corresponding first foldable parts OPS10-F in the third direction DR3, respectively.

When at least one of the second foldable parts OPS20-F overlaps at least one of the first foldable parts OPS10-F, a portion of the collective optical member OPP-1 defined by the first and second foldable parts OPS10-F and OPS20-F, which is inserted into the corresponding slit SLT, increases in thickness. Accordingly, as the first foldable parts OPS10-F and the second foldable parts OPS20-F are fixed to the bottom member BC, endurance thereof increases. A coupling of the overlapping first and second foldable parts OPS10-F and OPS20-F at the rear side of the bottom member BC may include any of the aforementioned processes or methods of coupling an optical sheet to a bottom member of a display device.

Figure 19:
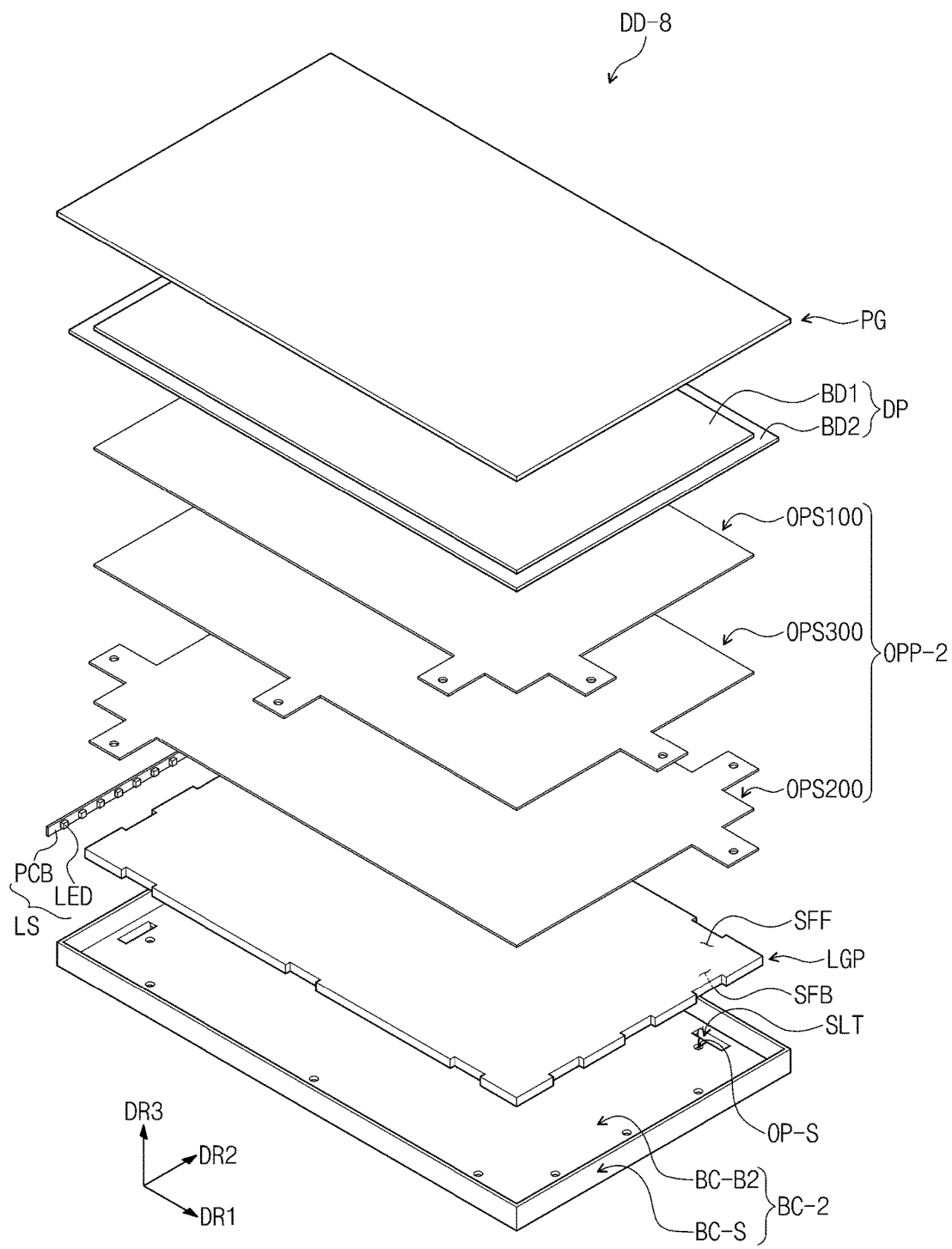
FIG. 19 is an exploded perspective view illustrating yet another exemplary embodiment of a display device according to the invention.

FIG. 19 is an exploded perspective view of yet another exemplary embodiment of a display device DD-8 according to the invention. As illustrated in FIG. 19, the display device DD-8 includes a protective glass PG, a display panel DP, a light guide plate LGP, a light source LS, an optical member OPP-2 and a bottom member BC-2.

Since description regarding the protective glass PG, the display panel DP, the light guide plate LGP and the light source LS is the same as that in FIGS. 1 to 2B, the overlapped description will be omitted.

The optical member OPP-2 includes a first optical sheet OPS100, a second optical sheet OPS200 and a third optical sheet OPS300. The first optical sheet OPS100, the second optical sheet OPS200 and the third optical sheet OPS300 may be differently selected from among the diffuser, the horizontal prism sheet, the vertical prism sheet or the brightness enhancement film. According to another exemplary embodiment of the invention, one among the first optical sheet OPS100, the second optical sheet OPS200 and the third optical sheet OPS300 may not include a foldable part.

Since description of the first optical sheet OPS100 is substantially the same as that of the first optical sheet OPS1 described in FIG. 17A, the overlapped description will be omitted. Since description of the second optical sheet OPS200 is substantially the same as that of the second optical sheet OPS2 described in FIG. 17B, the overlapped description will be omitted Since description of the third optical sheet OPS300 is substantially the same as that of the optical sheet OPS described in FIG. 3, the overlapped description will be omitted.

The foldable parts of the optical sheets OPS100, OPS200 and OPS300 may not overlap each other in the third direction DR3, as illustrated I FIG. 19, but the invention is not limited thereto. Referring to FIG. 18, foldable parts of two or three among the optical sheets OPS100, OPS200 and OPS300 may overlap each other in the third direction DR3.

A slit SLT provided in plurality corresponding to the foldable parts of the optical sheets OPS100, OPS200 and OPS300 are defined in the bottom part BC-B2 of the bottom member BC-2. The plurality of slits SLT may be divided into first slits corresponding to the first foldable parts, second slits corresponding to the second foldable parts, and third slits corresponding to the third foldable parts. The first slits, the second slits and the third slits may have the same shape as each other.

A screw opening OP-S may be further defined in plurality in the bottom part BC-B2 of the bottom member BC. The screw openings OP-S the guide openings of the foldable parts, respectively.

The foldable parts of the optical member OPP-2 are respectively inserted into the corresponding slits SLT defined in the bottom member BC and coupled to each other. A coupling of the foldable parts of the optical member OPP-2 which are at the rear side of the bottom member BC-2 may include any of the aforementioned processes or methods of coupling an optical sheet to a bottom member of a display device.

Figure 20A:
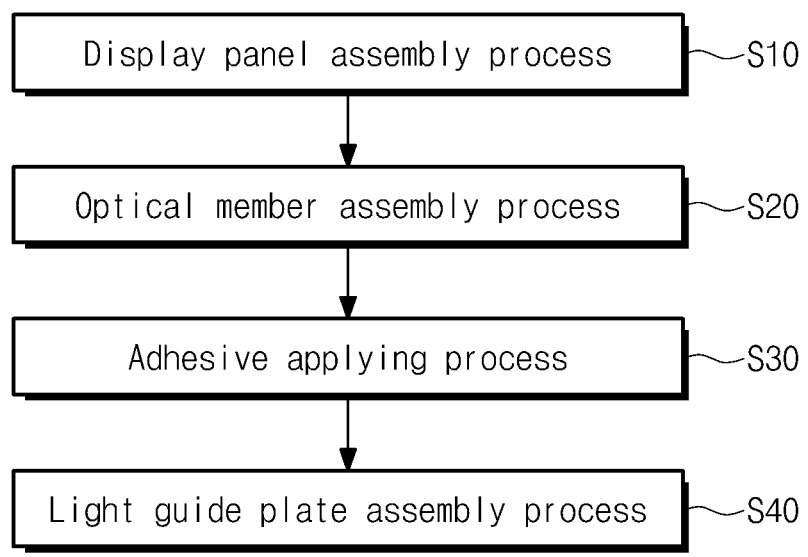
FIGS. 20A and 20B are flowcharts illustrating exemplary embodiments of a method of assembling the display device according to the invention.
Figure 20B:
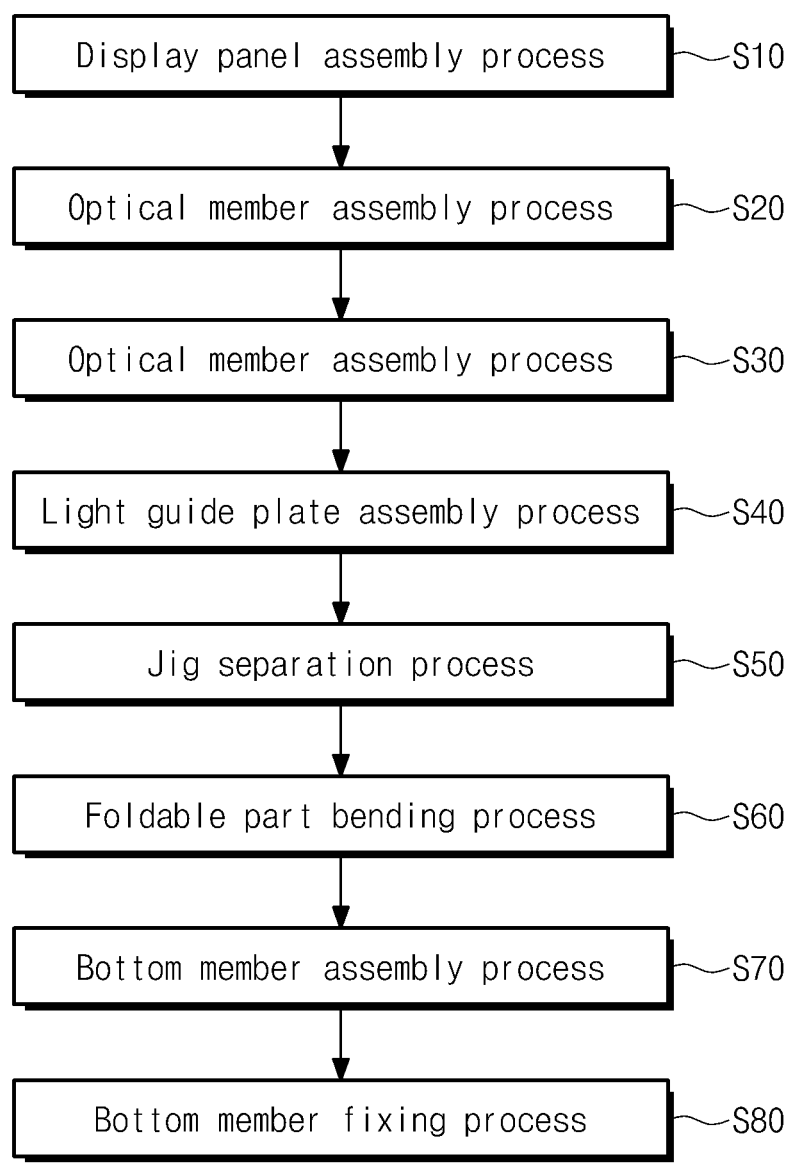

FIGS. 20A and 20B are flowcharts illustrating exemplary embodiments of a method of assembling the display device DD-8 according to the invention. FIGS. 21A to 21G are perspective views illustrating the exemplary embodiments of the method of assembling the display device DD-8 according to the invention. FIGS. 20A to 21G exemplarily illustrate the method of assembling the display device DD-8 in FIG. 19, but the invention is not limited thereto. The method of FIGS. 20A to 21G may also be applied to the display device DD-1 through DD-7.

The method of assembling the display device DD-8 includes a display panel assembly process S10, an optical member assembly process S20, an adhesive applying process S30 and a light guide plate assembly process S40. The processes S10 through S40 may define a method of assembling a display module.

Figure 21A:
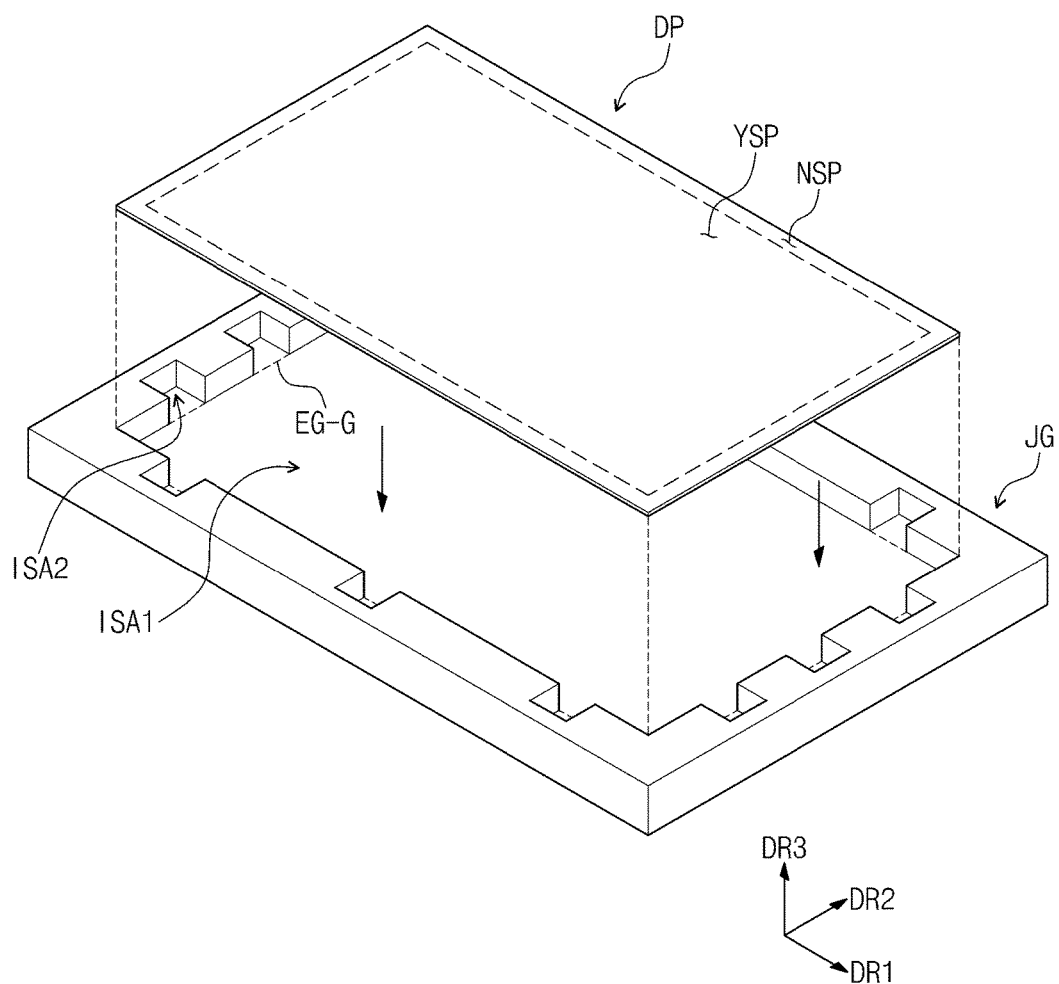
FIGS. 21A to 21G are perspective views illustrating the exemplary embodiments of the method of assembling the display device in FIGS. 20A and 20B

FIG. 21A illustrates the display panel assembly process S10. Since description regarding the display panel DP is the same as that in FIGS. 1 to 2B, the overlapped description will be omitted.

A jig JG is used for coupling the display panel DP, the optical member OPP-2 and the light guide plate LGP to each other to assemble the display module DM.

An accommodation space including a first insertion region ISA1 and a plurality of second insertion regions ISA2 is defined in and by the jig JG. In a plane defined by the first direction DR1 and the second direction DR2, the second insertion regions ISA2 extend from edges EG-G of the first insertion region ISA1, respectively. The edges EG-G of the first insertion region ISA1 may correspond to the edges EG1, EG2, EG3 and EG4 of the body OPS-B illustrated in FIG. 3.

In the display panel assembly process S10, the display panel DP is disposed on the first insertion region ISA1 of the jig JG.

Figure 21B:
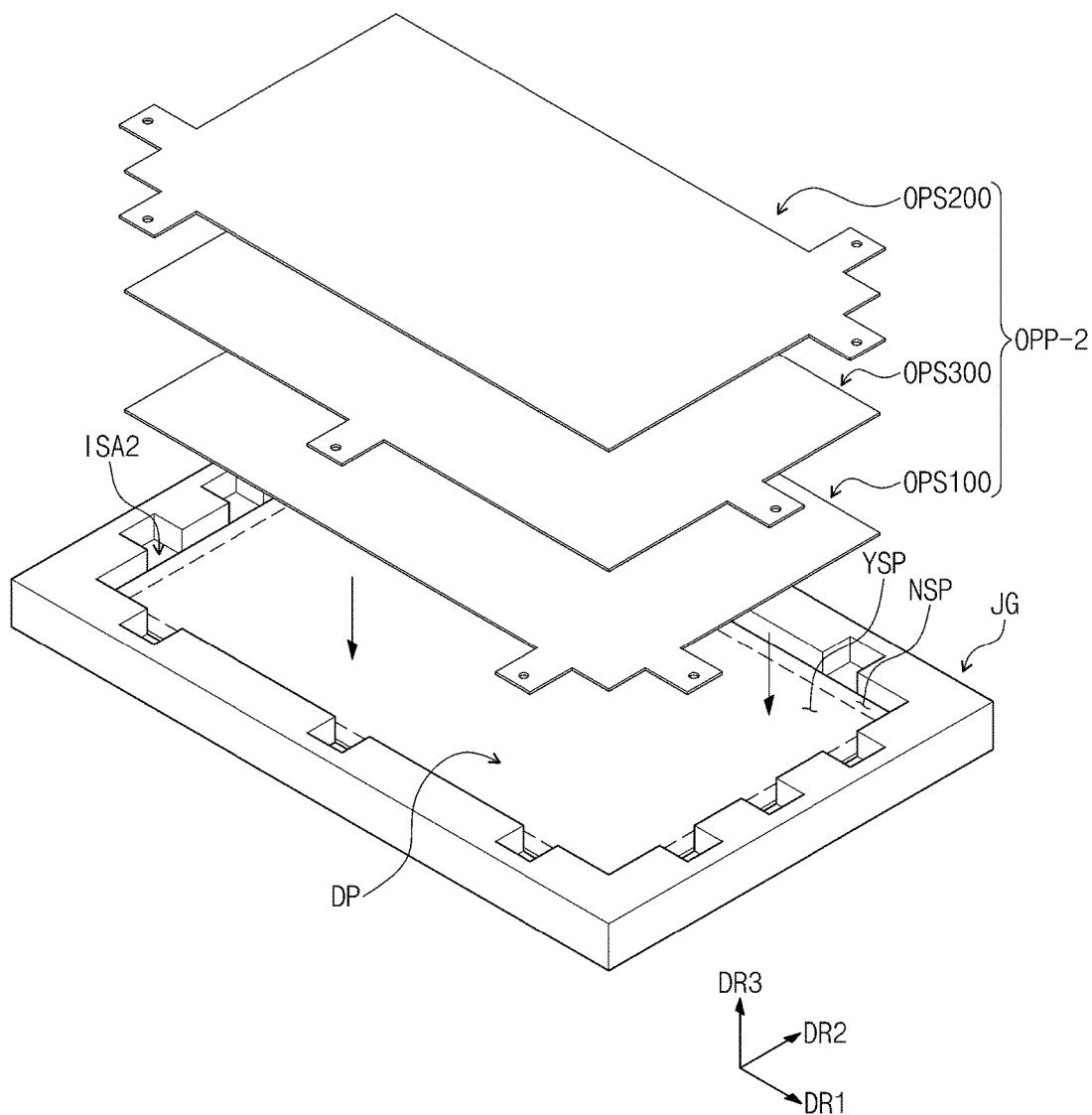

FIG. 21B illustrates the optical member assembly process S20. In the optical member assembly process S20, the optical member OPP-2 is disposed to contact the display panel DP in the third direction DR3. Although not shown, the optical member OPP-2 may further include an adhesion sheet for contacting the display panel DP, or an adhesion member may be disposed between the optical member OPP-2 and the display panel DP disposed in the jig JG. Since description regarding the first optical sheet OPS100, the second optical sheet OPS200 and the third optical sheet OPS300 is the same as that in FIG. 19, the overlapped description will be omitted.

According to an exemplary embodiment of the invention, the first optical sheet OPS100 is disposed to contact the display panel DP which is disposed in the jig JG. The third optical sheet OPS300 is disposed between the first optical sheet OPS100 and the second optical sheet OPS200 and contacts the first and second optical sheets OPS100 and OPS200. The second optical sheet OPS200 is disposed to contact the third optical sheet OPS300.

Figure 21C:
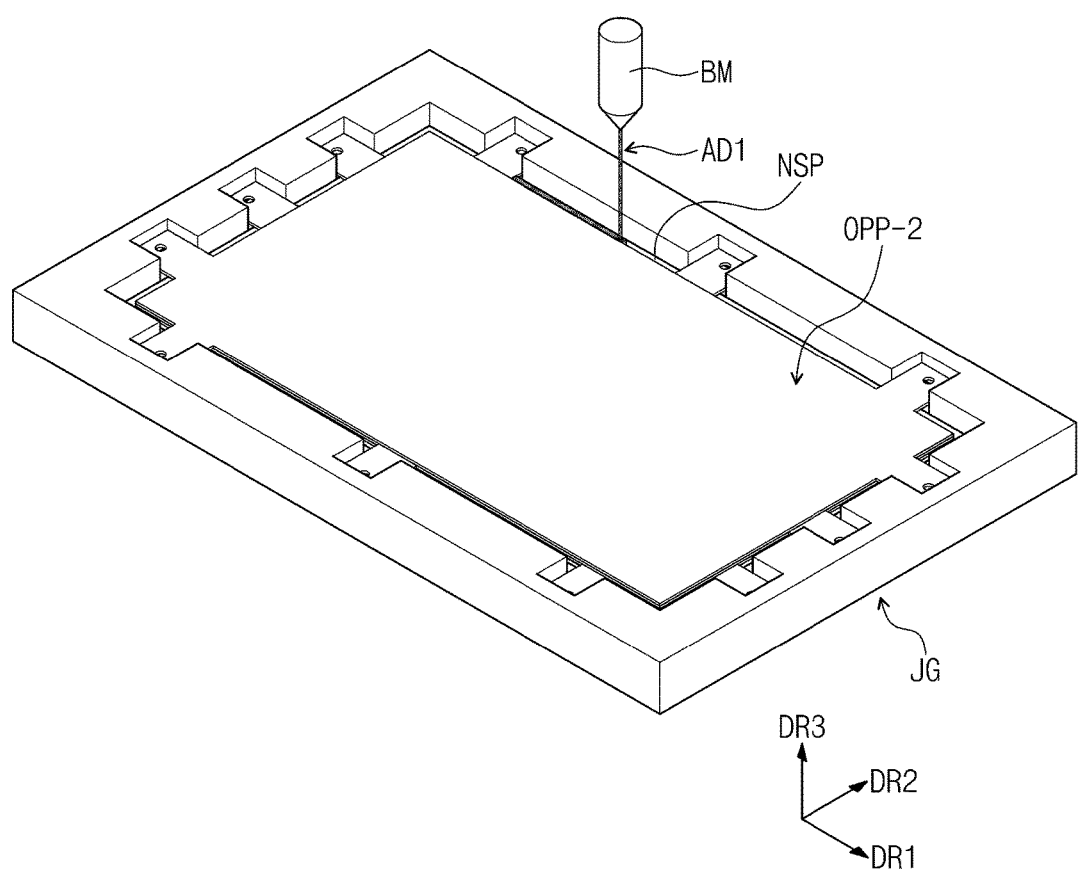

FIG. 21C illustrates the adhesive applying process S30. A first adhesion member material (labeled as AD1 for convenience) is applied to the non-overlapped area NSP at which the display panel DP does not overlap the optical member OPP-2. With the display DP and the optical member OPP-2 in the jig, the non-overlapped area NSP may be exposed to outside the jig JG. Since description regarding the non-overlapped area NSP is the same as that in FIGS. 4 and 10, the overlapped description will be omitted. Since description regarding the first adhesion member AD1 is the same as that in FIGS. 9 and 10, the overlapped description will be omitted.

An adhesive applying tool BM may be used to apply the first adhesion member material (AD1 in FIG. 21C). The adhesive applying tool BM may uniformly apply a suitable amount of the first adhesion member material AD1 on the exposed non-overlapped area NSP of the display panel DP in the jig JG.

Figure 21D:
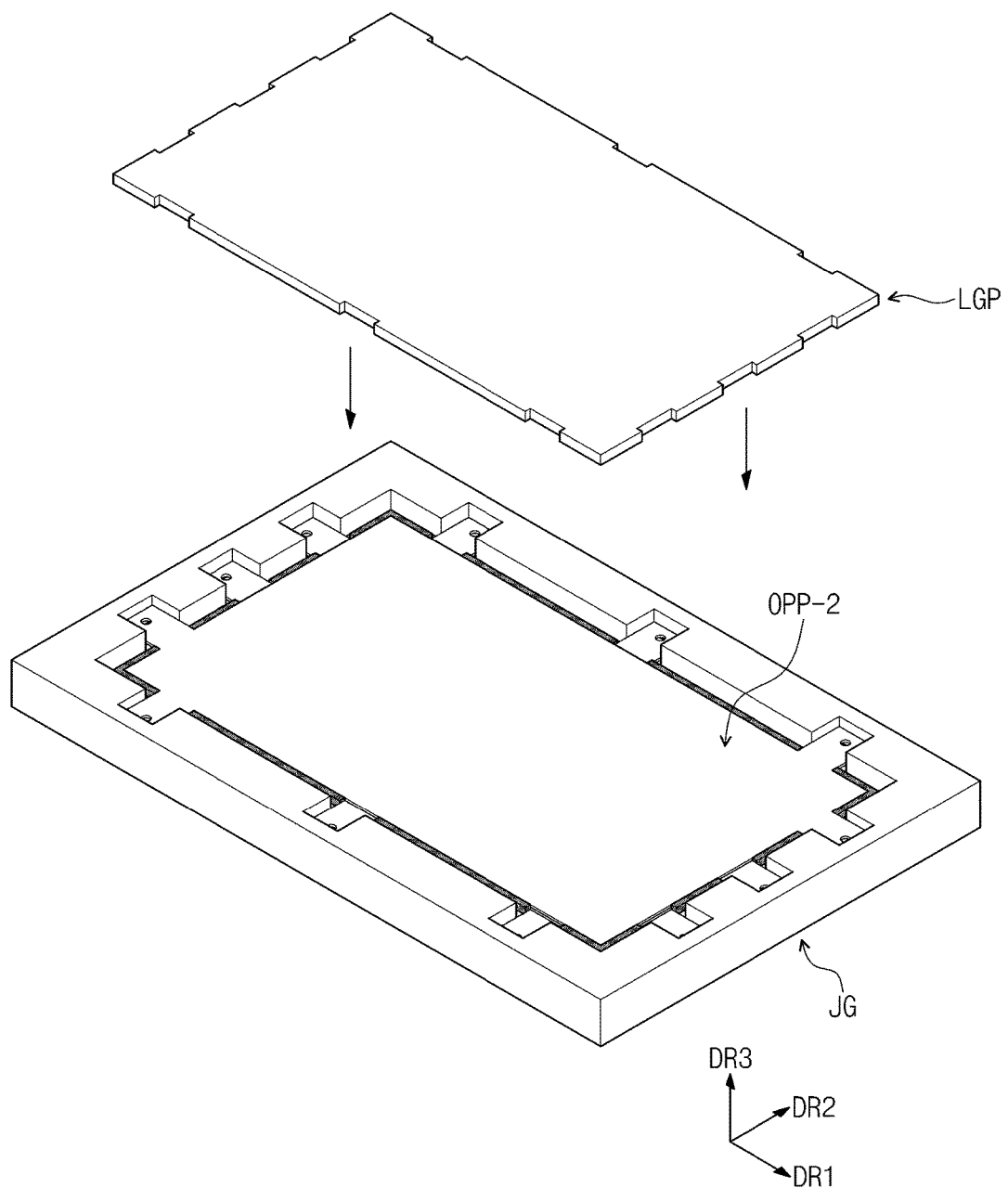

FIG. 21D illustrates the light guide plate assembly process S40. The display panel DP and the light guide plate LGP are adhered to each other with the optical member OPP-2 therebetween. Accordingly, the display module DM (refer to FIG. 4) in which the display panel DP, the optical member OPP-2 and the light guide plate LGP are coupled to each other may be assembled.

Figure 21E:
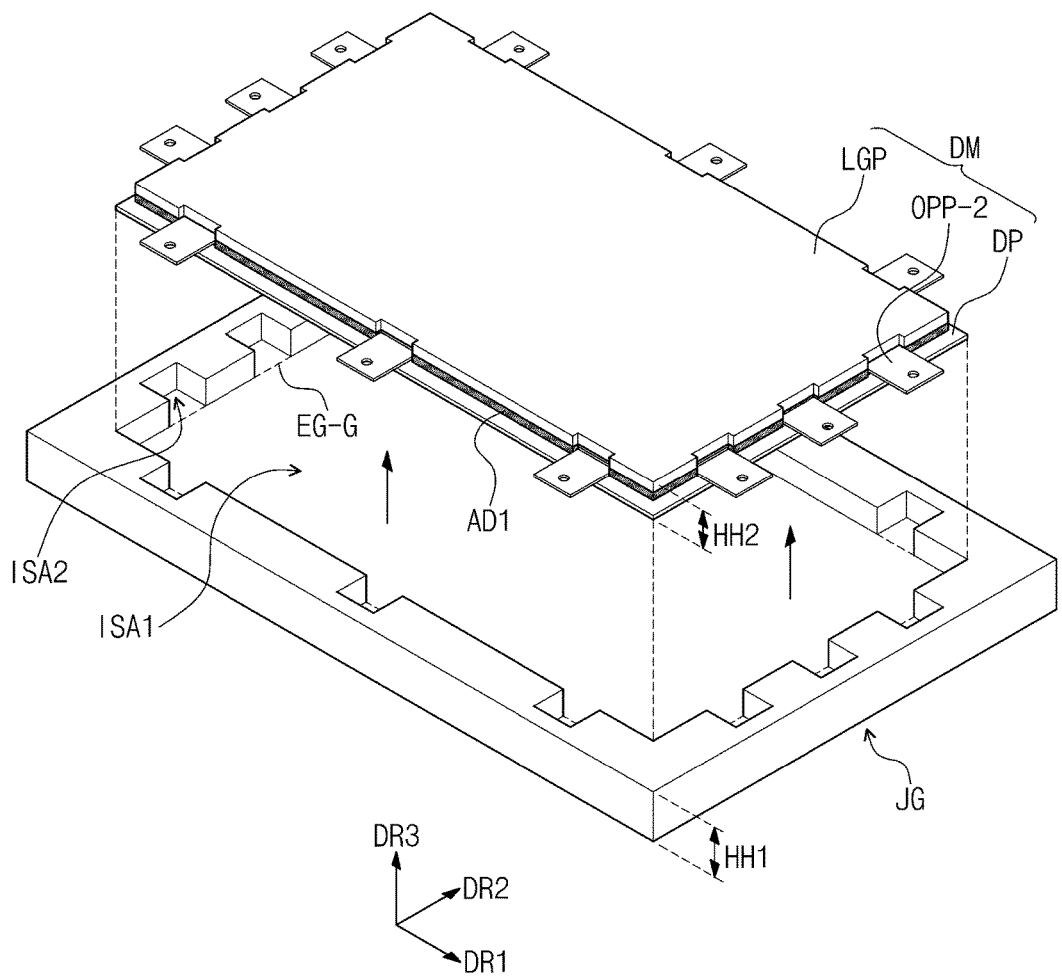

The method of assembling the display device DD-8 may further include a jig separation process S50. FIG. 21E illustrates the jig separation process S50. When the display module DM is inserted into the jig JG, since an additional process to form the display device DD-8 is difficult to be performed, the display module DM is separated from the jig JG. The display module DM and the components thereof are in a flat (un-bended) state thereof when in the jig JG and when separated from the jig JG in the jig separation process S50.

A total height HH1 (hereinafter, referred to as a first height) of the jig JG is measured in the third direction DR3 is greater than a total height HH2 (hereinafter, referred to as a second height) of the display module DM measured in the third direction DR3. A minimum total height HH1 may be greater than a maximum total height HH2. When the first height HH1 is greater than the second height HH2, the display module DM is stably held in the jig JG.

Figure 21F:
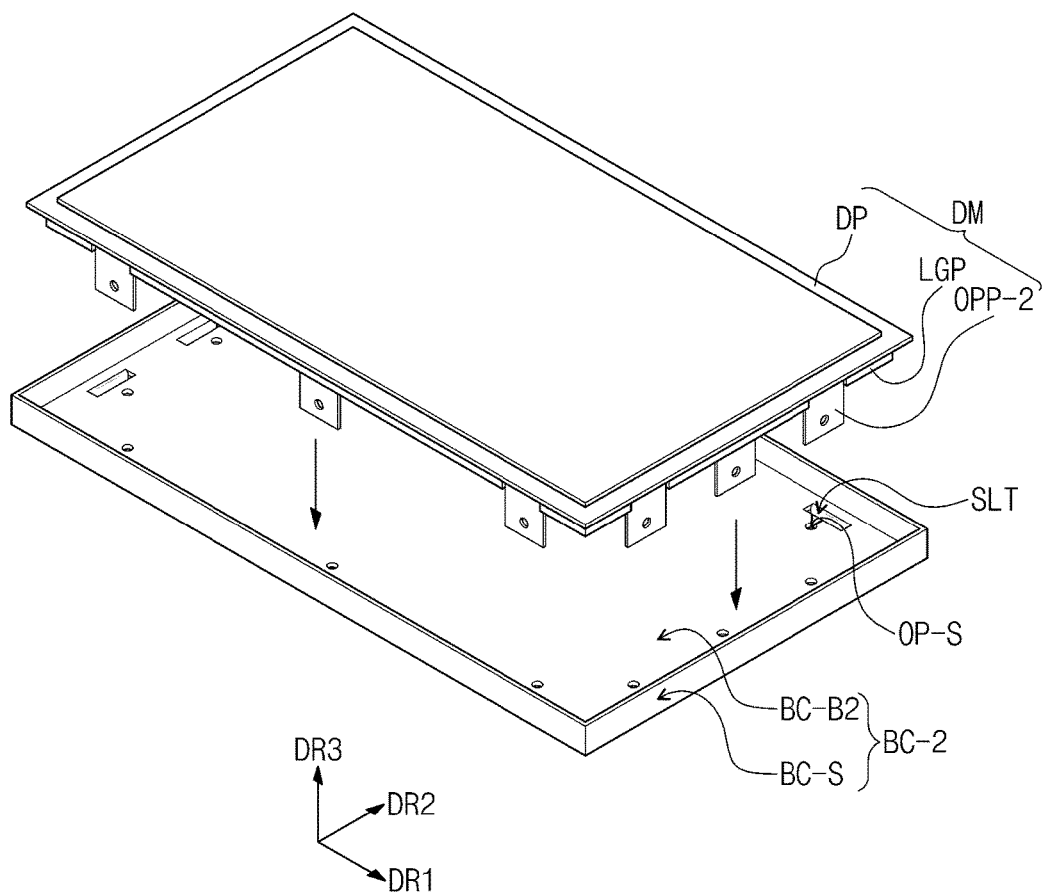

The method of assembling the display device DD-8 may further include a foldable part bending process S60 and a bottom member assembly process S70. FIG. 21F illustrates the foldable part bending process S60 and the bottom member assembly process S70.

In the foldable part bending process S60, from the flat state thereof (FIG. 21E), each of the foldable parts of the optical member OPP-2 is bent from the corresponding body among the bodies.

According to an exemplary embodiment of the invention, the foldable part bending process S60 may be performed after the jig separation process S50 is performed. In this case, the display module DM is separated from the jig JG and is disposed in a flat state, and then the foldable parts of the optical member OPP-2 within the flat-state display module DM are bent to be disposed in a different plane than that of the flat state.

According to another exemplary embodiment of the invention, the foldable part bending process S60 may be performed before the jig separation process S50 is performed. With the foldable parts accommodated in the second insertion region ISA2 of the jig JG, from the flat state thereof (FIGS. 21D and 21E), each of the foldable parts of the optical member OPP-2 is bent from the corresponding body among the bodies. In this case, the display module DM with the foldable parts in a bent state (FIG. 21F) is separated from the jig JG.

In the bottom member assembly process S70, the bent-state foldable parts may be inserted into the corresponding plurality of slits SLT of the bottom member BC-2, respectively. Since description regarding the bottom member assembly process S70 is the same as that in FIGS. 6 and 7A, the overlapped description will be omitted.

Figure 21G:
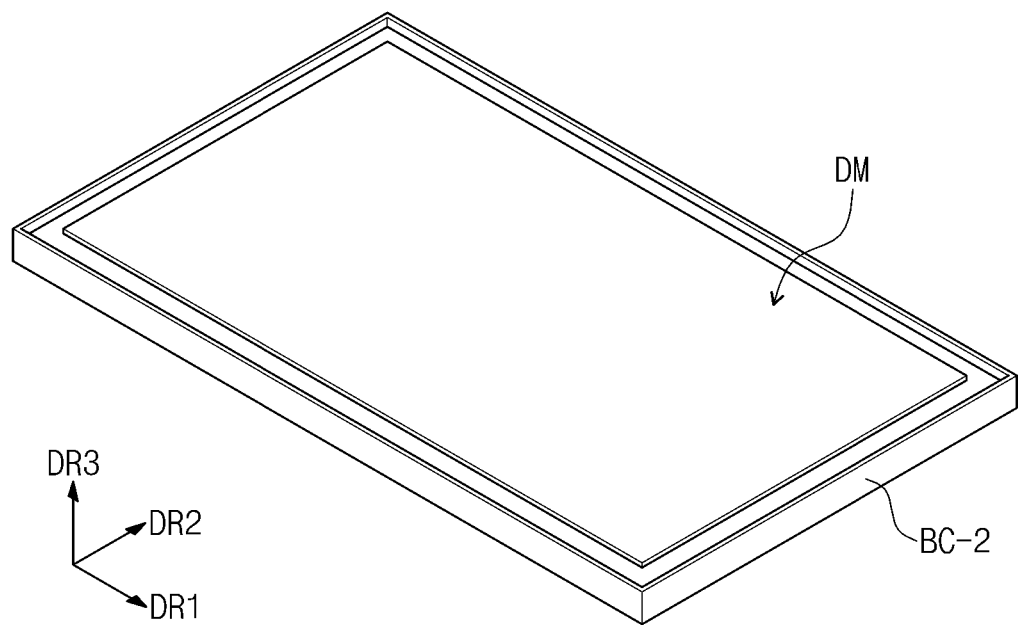

The method of assembling the display device DD-8 may further include a bottom member fixing process S80. FIG. 21G illustrates the bottom member fixing process S80.

In the bottom member fixing process S80, each of the bent-state foldable parts is fixed to the bottom member BC. According to an exemplary embodiment of the invention, since description regarding the bottom member fixing process S80 is substantially the same as that in FIGS. 7B to 7D, the overlapped description will be omitted The bottom member fixing process S80 corresponding to FIGS. 7B to 7D may include a process of further bending each of the bent-state foldable parts OPS-F to insert the corresponding male screw OTH of the male screws OTH into the guide opening OP-G and a process of arranging the protective members SG on the corresponding foldable parts OPS-F for which the corresponding male screw OTH has been inserted into the guide opening OP-G.

According to each of exemplary embodiments of the invention, the descriptions regarding the bottom member fixing process S80 is substantially the same as that in FIGS. 11 to 15.

As described above for one or more exemplary embodiment, a display device having a relatively small overall thickness and relatively slim bezel may be provided.

Also, as described above, for one or more exemplary embodiment of a method of manufacturing a display device, the display device having the relatively small overall thickness and relatively slim bezel may be provided.

It will be apparent to those skilled in the art that various modifications and variations can be made in the invention.

Thus, it is intended that the invention covers the modifications and variations of this invention provided they come within the scope of the appended claims and their equivalents.

Hence, the real protective scope of the invention shall be determined by the technical scope of the accompanying claims.

What is claimed is:

1. A display device comprising:
a display panel;
an optical member comprising a first optical sheet, the first optical sheet comprising a first body contacting a bottom surface of the display panel and a plurality of first foldable portions extending from the first body;
a light guide plate overlapping the first body and disposed below the optical member; and
a bottom member disposed below the light guide plate, and a plurality of first slits which correspond to the plurality of first foldable portions are defined in the bottom member,
wherein the plurality of first foldable portions are bent from the first body, respectively inserted into the plurality of first slits, and fixed to the bottom member.

2. The display device of claim 1, wherein
the optical member further comprises a second optical sheet, the second optical sheet comprises a second body overlapping a bottom surface of the first body and a plurality of second foldable portions extending from the second body,
a plurality of second slits which correspond to the plurality of second foldable portions are further defined in the bottom member, and
the plurality of second foldable portions are bent from the second body, respectively inserted into the plurality of second slits, and fixed to the bottom member.

3. The display device of claim 2, wherein
the optical member further comprises a third optical sheet disposed below the second optical sheet or disposed between the first optical sheet and the second optical sheet, and
the third optical sheet has substantially the same shape as that of the second body of the second optical sheet.

4. The display device of claim 2, wherein
the optical member further comprises a third optical sheet disposed below the second optical sheet, the third optical sheet comprises a third body overlapping a bottom surface of the second body and a plurality of third foldable portions extending from the third body,
a plurality of third slits which respectively correspond to the plurality of third foldable portions are further defined in the bottom member, and
the plurality of third foldable portions are bent from the third body, respectively inserted into the plurality of third slits, and fixed to the bottom member.

5. The display device of claim 2, wherein the first optical sheet and the second optical sheet are selected from among a diffuser configured to diffuse the light guided by the light guide plate, a horizontal prism sheet configured to laterally adjust directivity of light incident thereto, a vertical prism sheet configured to vertically adjust the directivity of light incident thereto, and a brightness enhancement film configured to enhance brightness of light incident thereto.

6. The display device of claim 2, wherein at least one of the plurality of first foldable portions of the first optical sheet overlaps at least one of the plurality of second foldable portions of the second optical sheet.

7. The display device of claim 6, wherein the at least one overlapping first foldable portion of the first optical sheet has substantially a same shape as that of the at least one overlapping second foldable portion of the second optical sheet.

8. The display device of claim 2, wherein the plurality of first foldable portions of the first optical sheets do not overlap the plurality of second foldable portions of the second optical sheet.

9. The display device of claim 8, wherein each of the plurality of first foldable portions of the first optical sheet has substantially the same shape as that of each of the plurality of second foldable portions of the second optical sheet.

10. The display device of claim 2, wherein in a top plan view, each of the first body of the first optical sheet and the second body of the second optical sheet has an area less than that of the display panel.

11. The display device of claim 10, further comprising an adhesion member disposed between the light guide plate and the display panel to couple the light guide plate to the display panel.

12. The display device of claim 1, wherein the first body defines four first edges of the first optical sheet, and the plurality of first foldable portions of the first optical sheet respectively extend from the four first edges thereof.

13. The display device of claim 1, further comprising:
a male threaded member provided in plurality,
wherein
the plurality of first foldable portions respectively defines a guide opening therein,
the bottom member comprises:
a bottom portion thereof in which the plurality of first slits are defined, and
a female threaded member provided in plurality protruding from the bottom portion,
the plurality of female threaded members of the bottom member are respectively inserted into the plurality of guide openings of the plurality of first foldable portions of the first optical sheet, and
the plurality of male threaded members are respectively coupled to the plurality of female threaded members inserted into the plurality of guide openings to fix the plurality of first foldable portions to the bottom member.

14. The display device of claim 13, further comprising a protective member provided in plurality each defining a fixing opening therein into which the plurality of female threaded members are respectively inserted,
wherein
the plurality of protective members are respectively disposed on the plurality of first foldable portions into which the plurality of female threaded members of the bottom member are respectively inserted, and
the plurality of male threaded members respectively coupled to the plurality of female threaded members of the bottom member extends through a corresponding fixing opening of the protective members to fix the protective member to the bottom member.

15. The display device of claim 1, further comprising:
a female threaded member provided in plurality,
wherein
the plurality of first foldable portions respectively defines a guide opening therein,
the bottom member comprises:
a bottom portion thereof in which the plurality of first slits are defined, and
a male threaded member provided in plurality protruding from the bottom portion,
the plurality of male threaded member of the bottom member are respectively inserted into the plurality of guide openings of the plurality of first foldable portions of the first optical sheet, and
the plurality of female threaded members are respectively coupled to the plurality of male threaded members inserted into the plurality of guide openings to fix the plurality of first foldable portions to the bottom member.

16. The display device of claim 15, further comprising a protective member provided in plurality each defining a fixing opening therein into which the plurality of male threaded member are respectively inserted,
wherein
the plurality of protective members are respectively disposed on the plurality of first foldable portions into which the plurality of male threaded members of the bottom member are respectively inserted, and
the plurality of the female threaded members respectively coupled to the plurality of male threaded members of the bottom member extends through a corresponding fixing opening of the protective members to fix the protective member to the bottom member.

17. The display device of claim 1, further comprising an adhesion member provided in plurality respectively between the plurality of first foldable portions of the first optical sheet and the bottom member to fix the plurality of first foldable portions to the bottom member.

18. The display device of claim 1, wherein a plurality of cut-away portions are defined in the plurality of first foldable parts, respectively, and
the bottom member comprises a bottom part in which the plurality of first slits are defined and a plurality of hooks protruding from the bottom part and respectively inserted into the plurality of cut-away portions.

19. The display device of claim 1, wherein
the bottom member comprises:
a bottom portion thereof in which the plurality of first slits are defined, and
a cut portion of the bottom portion bent away from the display panel to define a support member provided in plurality respectively at one side of each of the plurality of first slits, and
the plurality of support members cut from the bottom portion and bent away from the display panel respectively defines dimensions of the plurality of first slits.

20. A method of assembling a display device, the method comprising:
assembling a display module of the display device which displays an image with light, the display device comprising: a display panel, an optical member comprising a first optical sheet and a second optical sheet, a light guide plate, and a bottom member, the assembling the display module comprising:
a display panel assembly process in which:
a jig is provided including an accommodation space thereof defined by a first insertion region and a second insertion region which is provided in plurality extending from edges of the first insertion region, and
the display panel is disposed in the first insertion region of the jig;

an optical member assembly process in which:
  the optical member is disposed in the accommodation space of the jig to contact the display panel disposed in the first insertion region of the jig,
  wherein the optical member disposed in the accommodation space of the jig exposes a portion of the display panel in the jig and comprises:
    the first optical sheet defining a first body thereof disposed in the first insertion region of the jig, and a first foldable portion thereof provided in plurality extending from the first body and respectively disposed in a corresponding second insertion region among the plurality of second insertion regions of the jig, and
    the second optical sheet defining a second body thereof disposed in the first insertion region of the jig, and a second foldable portion thereof provided in plurality extending from the second body and respectively disposed in the corresponding second insertion region of the plurality of second insertion regions in which the first foldable portion is disposed;
an adhesive applying process in which an adhesive is applied to the exposed portion of the display panel in the jig;
a light guide plate assembly process in which:
  the light guide plate is disposed in the accommodation space of the jig with the display panel and the optical member disposed therein, and
  the display panel and the light guide plate are adhered to each other with the optical member therebetween, to assemble the display module in the accommodation space of the jig to comprise the display panel, the optical member and the light guide plate, and
a jig separation process in which the assembled display module disposed in the accommodation space of the jig is separated from the jig.

21. The method of claim 20, further comprising a foldable portion bending process in which the plurality of first foldable portions of the first optical sheet are bent from the first body and toward the bottom member, and the plurality of second foldable portions are bent from the second body and toward the bottom member.

22. The method of claim 21, further comprising a bottom member assembly process in which:
  a first slit and a second slit are each defined in plurality in the bottom member,
  the plurality of bent first foldable portions are respectively inserted into the plurality of first slits, and
  the plurality of bent second foldable portions are respectively inserted into the plurality of second slits.

23. The method of claim 22, further comprising a bottom member fixing process in which the plurality of bent first foldable portions inserted into the plurality of first slits and the plurality of second bent foldable portions inserted into the plurality of second slits are fixed to the bottom member.

24. The method of claim 23, wherein
the optical member which is disposed in the accommodation space of the jig and exposes the portion of the display panel in the jig further comprises a third optical sheet which defines:
  a third body thereof disposed in the first insertion region of the jig, and
  a third foldable portion thereof provided in plurality extending from the third body and respective disposed in the corresponding second insertion region among the plurality of second insertion regions of the jig,
in the foldable portion bending process, the plurality of third foldable portions are bent from the third body and toward the bottom member,
in the bottom member assembly process,
  a third slit is defined in plurality in the bottom member, and
  the plurality of bent third foldable portions are inserted into the plurality of third slits, respectively, and
in the bottom member fixing process, the plurality of bent third foldable portions inserted into the plurality of third slits are fixed to the bottom member.

25. The method of claim 24, wherein a number of the plurality of second insertion regions of the jig is the same as that of the first to third foldable portions of the optical member.

26. The method of claim 24, wherein the first optical sheet, the second optical sheet, and the third optical sheet are selected from a diffuser configured to diffuse light guided by the light guide plate, a horizontal prism sheet configured to laterally adjust directivity of light incident thereto, a vertical prism sheet configured to vertically adjust the directivity of light incident thereto, and a brightness enhancement film configured to enhance brightness of light incident thereto.

27. The method of claim 23, wherein
a guide opening is respectively defined in each of the plurality of bent first foldable portions and the plurality of bent second foldable portions of the optical member,
the bottom member comprises a female threaded member provided in plurality, and
in the bottom member fixing process,
  each of the plurality of bent first foldable portions and the plurality of bent second foldable portions of the optical member is further bent to insert a female threaded member of the bottom member into a corresponding guide opening, and
  a male threaded member provided in plurality is respectively coupled to the female threaded member inserted into the corresponding guide opening to fix the plurality of first foldable portions and the plurality of second foldable portions of the optical member to the bottom member.

28. The method of claim 23, wherein
a guide opening is respectively defined in each of the bent plurality of first foldable portions and the plurality of bent second foldable portions of the optical member,
the bottom member comprises a female threaded member provided in plurality, and
in the bottom member fixing process:
  each of the plurality of bent first foldable portions and the plurality of bent second foldable portions of the optical member is further bent to insert a female threaded member of the bottom member into a corresponding guide opening;
  a protective member provided in plurality is respectively disposed on a corresponding one among the plurality of first foldable portions and the plurality of second foldable portions, each protective member defining a fixing opening thereof which is aligned with the corresponding guide opening into which the female threaded member is inserted; and
  a male threaded member provided in plurality is respectively coupled to the female threaded member inserted into the corresponding guide opening to fix the plurality of first foldable portions and the plurality of second foldable portions of the optical member to the bottom member.

29. The method of claim 23, wherein
a guide opening is respectively defined in each of the plurality of bent first foldable portions and the plurality of bent second foldable portions of the optical member,
the bottom member comprises a male threaded member provided in plurality, and
in the bottom member fixing process,
  each of the plurality of bent first foldable portions and the plurality of bent second foldable portions of the optical member is further bent to insert a male threaded member of the bottom member into a corresponding guide opening, and
  a female threaded member provided in plurality is respectively coupled to the male threaded member inserted into the corresponding guide opening to fix the plurality of first foldable portions and the plurality of second foldable portions of the optical member to the bottom member.

30. The method of claim 23, wherein
a guide opening is respectively defined in each of the plurality of bent first foldable portions and the plurality of bent second foldable portions of the optical member,
the bottom member comprises a male threaded member provided in plurality, and
in the bottom member fixing process:
  each of the plurality of bent first foldable portions and the plurality of bent second foldable portions of the optical member is further bent to insert a male threaded member of the bottom member into a corresponding guide opening;
  a protective member provided in plurality is respectively disposed on a corresponding one among the plurality of first foldable portions and the plurality of second foldable portions, each protective member defining a fixing opening thereof which is aligned with the corresponding guide opening into which the male threaded member is inserted; and
  a male threaded member provided in plurality is respectively coupled to the male threaded member inserted into the corresponding guide opening to fix the plurality of first foldable portions and the plurality of second foldable portions of the optical member to the bottom member.

31. The method of claim 23, wherein in the bottom member fixing process, the plurality of bent first foldable portions inserted into the plurality of first slits and the plurality of bent second foldable portions inserted into the plurality of second slits are fixed to the bottom member by using an adhesive.

32. The method of claim 23, wherein
the plurality of bent first foldable portions and the plurality of bent second foldable portions of the optical member each defines a slit therein,
the bottom member comprises a hook provided in plurality respectively corresponding to the slits of the plurality of bent first foldable portions and the plurality of bent second foldable portions of the optical member, and
in the bottom member fixing process, the hook of the bottom member is inserted into a corresponding slit of the plurality of bent first foldable portions and the plurality of bent second foldable portions to fix the plurality of first foldable portions and the plurality of second foldable portions of the optical member to the bottom member.

33. The method of claim 20, wherein
the bottom member comprises:
  a bottom portion thereof in which a plurality of first slits and a plurality of second slits are defined, and
  a cut portion of the bottom portion bent away from the display panel to define a support member provided in plurality respectively at one side of each of the plurality of first slits and the plurality of second slits, and
the plurality of support members cut from the bottom portion and bent away from the display panel respectively defines dimensions of the plurality of first slits and the plurality of second slits of the bottom member.

* * * * *